AUTOMOTIVE DEVICE

Filed Aug. 24, 1959 12 Sheets-Sheet 1

INVENTORS
CHARLES M. PERKINS
THOMAS V. McNAMARA
BY
Woodhams, Blanchard & Flynn
ATTORNEYS March 14, 1961 C. M. PERKINS ET AL 2,974,766

AUTOMOTIVE DEVICE

Filed Aug. 24, 1959 12 Sheets-Sheet 2

INVENTORS
CHARLES M. PERKINS
THOMAS V. McNAMARA
BY
Woodhams, Blanchard & Flynn
ATTORNEYS March 14, 1961 C. M. PERKINS ET AL 2,974,766

AUTOMOTIVE DEVICE

Filed Aug. 24, 1959 12 Sheets-Sheet 3

NEUTRAL - VEHICLE AT STANDSTILL

INVENTORS
CHARLES M. PERKINS
THOMAS V. McNAMARA

BY Woodhams Blanchard & Flynn
ATTORNEYS

March 14, 1961 C. M. PERKINS ET AL 2,974,766

AUTOMOTIVE DEVICE

Filed Aug. 24, 1959 12 Sheets-Sheet 4

FIRST STAGE OF SHIFTING FROM NEUTRAL TO FIRST

INVENTORS
CHARLES M. PERKINS
THOMAS V. McNAMARA
BY
Woodhams Blanchard & Flynn
ATTORNEYS

AUTOMOTIVE DEVICE

Filed Aug. 24, 1959 12 Sheets-Sheet 5

SECOND STAGE OF SHIFTING FROM NEUTRAL TO FIRST

INVENTORS
CHARLES M. PERKINS
THOMAS V. McNAMARA
BY
Woodhams Blanchard & Flynn
ATTORNEYS

THIRD STAGE OF SHIFTING FROM NEUTRAL TO FIRST

INVENTORS
CHARLES M. PERKINS
THOMAS V. McNAMARA
BY
Woodhams Blanchard & Flynn
ATTORNEYS March 14, 1961 C. M. PERKINS ET AL 2,974,766

AUTOMOTIVE DEVICE

Filed Aug. 24, 1959 12 Sheets-Sheet 7

FOURTH STAGE OF SHIFTING FROM NEUTRAL TO FIRST

INVENTORS
CHARLES M. PERKINS
THOMAS V. McNAMARA
BY
Woodhams Blanchard & Flynn
ATTORNEYS INVENTORS
CHARLES M. PERKINS
THOMAS V. McNAMARA
BY
Woodhams Blanchard & Flynn
ATTORNEYS March 14, 1961 C. M. PERKINS ET AL 2,974,766

AUTOMOTIVE DEVICE

Filed Aug. 24, 1959 12 Sheets-Sheet 9

FIRST STAGE OF SHIFTING FROM FIRST TO SECOND

INVENTORS
CHARLES M. PERKINS
THOMAS V. McNAMARA
BY
Woodhams Blanchard & Flynn
ATTORNEYS March 14, 1961 C. M. PERKINS ET AL 2,974,766

AUTOMOTIVE DEVICE

Filed Aug. 24, 1959 12 Sheets-Sheet 10

SECOND STAGE OF SHIFTING FROM FIRST TO SECOND

INVENTORS
CHARLES M. PERKINS
THOMAS V. McNAMARA

BY

Woodhams Blanchard & Flynn
ATTORNEYS

SHIFT TO SECOND GEAR COMPLETED

INVENTORS
CHARLES M. PERKINS
THOMAS V. McNAMARA
BY
Woodhams Blanchard & Flynn
ATTORNEYS

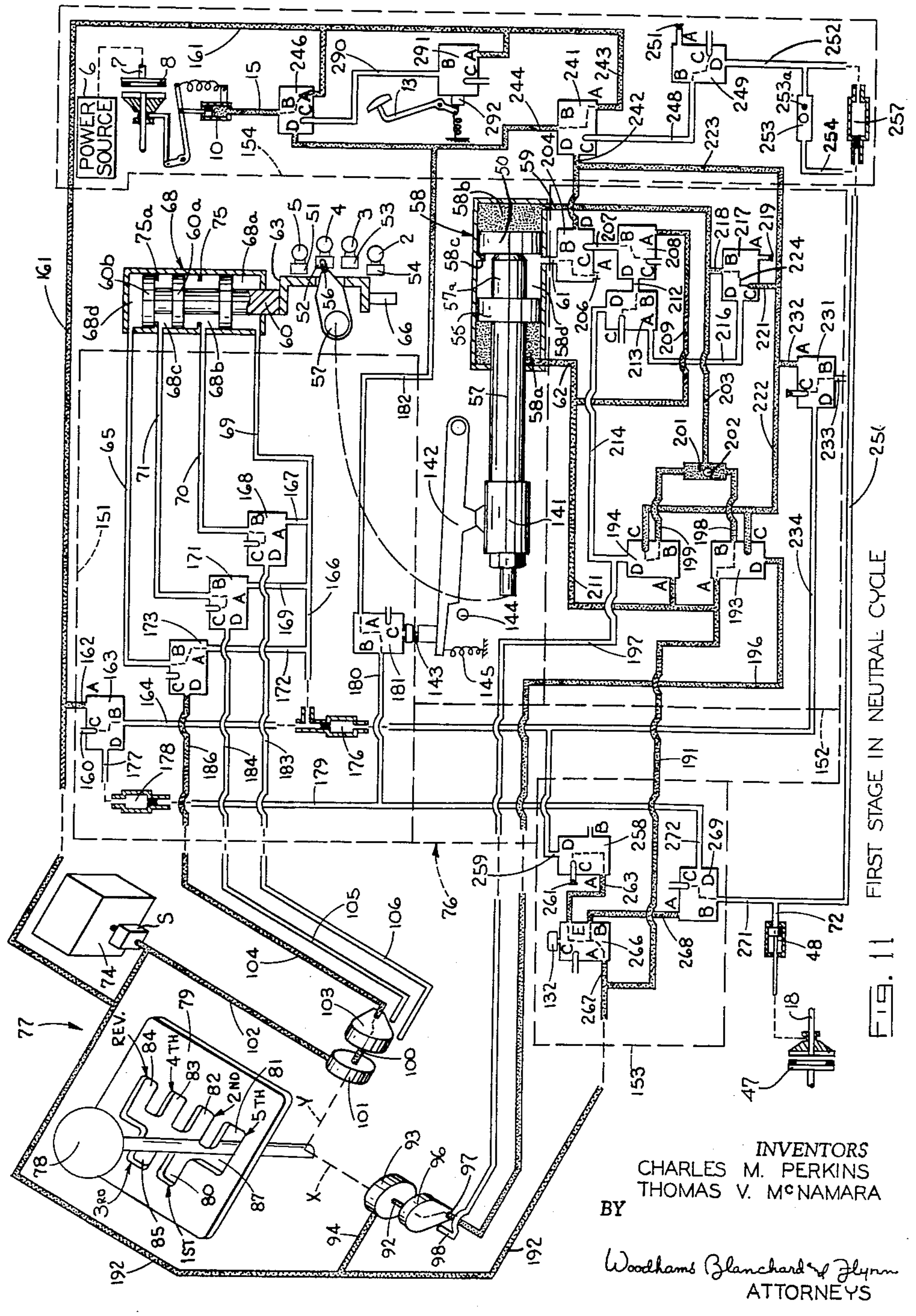
FIG. 11 FIRST STAGE IN NEUTRAL CYCLE
INVENTORS
CHARLES M. PERKINS
THOMAS V. McNAMARA
BY
Woodhams Blanchard & Flynn
ATTORNEYS United States Patent Office 2,974,766

Patented Mar. 14, 1961

2,974,766

AUTOMOTIVE DEVICE

Charles M. Perkins, Oshtemo Township, Kalamazoo County, and Thomas V. McNamara, Cooper Township, Kalamazoo County, Mich., assignors to Fuller Manufacturing Company, a corporation of Delaware Filed Aug. 24, 1959, Ser. No. 835,748

22 Claims. (Cl. 192—3.5)

This invention relates to shift control mechanism for shifting an assembly of toothed members, such as in a transmission, and it relates particularly to shift control mechanism capable of effecting a shift at an extremely rapid rate and also capable of automatic shifting under full manual selection.

The embodiment here used to illustrate the invention has been developed primarily for use in automotive vehicles, such as heavy duty trucks and earth moving equipment, and accordingly the following discussion will proceed primarily in connection with such equipment. However, it will be understood that the transmission shift control of the present invention is applicable to a wide range of transmission uses, such as derricks, boat machinery, mine hoist equipment, and others of similar nature, so that the employment of automotive equipment as the means for illustrating the invention should be understood as illustrative only and in no sense as limiting.

In the provision of transmission shifting apparatus for high-load, low-speed usage, such as for heavy duty trucks or earth moving equipment, there has long been a serious problem of effecting smooth and clash-free shifts with a minimum of effort on the part of the operator. In such equipment, the problems of shifting are far more serious than in the shifting of relatively light-load, high-speed devices, such as passenger vehicles, inasmuch as the parts whose speed is to be changed are much heavier and have consequently much greater inertia. At the same time, these vehicles, because of their high load and low speed at the time of shifting, usually have less tendency to continue running under their own momentum than is the case with lighter or faster vehicles and, therefore, the speed of rotation of the toothed members connected with the drive shaft of the vehicle changes extremely rapidly during a shifting operation. This is particularly true of earth moving equipment and of trucks when shifting during an uphill climb. Therefore, while the use of synchronizers has in the past been acceptable for controlling shifting operations and rendering them substantially rake-free in the case of passenger vehicles and in relatively light trucks, these means are not entirely satisfactory for keeping rake-free shifting operations of transmissions of heavy duty vehicles. This problem has been especially serious for earth moving vehicles since they operate under extremely high loads and at very low speeds such that if a shift is made while the vehicle is under load the rate of deceleration of the toothed members of the transmission thereof is so great that it is virtually impossible, even when using very large synchronizers, to make a shift without serious raking of the toothed members.

Granting for the moment, however, that with sufficiently large synchronizers, the transmission gears could be caused to change speed with sufficient rapidity to effect the necessary synchronizing, this would still provide no solution for the problem of properly changing engine speed. It is well known that in an upshift the engine speed must be reduced and there is often substantial hesitation in neutral position to permit this to take place.

Likewise, in a downshift the engine speed must increase and there is usually provided a sufficient pause in neutral position to permit the engine speed to increase. Though all of this is within the control of the operator, it requires an exceedingly high degree of skill to control the engine speed accurately and it is extremely difficult to do where the shift must take place with the rapidity required in high-load, low speed operations, such as in dirt moving equipment or in very heavy trucks. The use of a countershaft brake has proved quite satisfactory for meeting this problem in an upshift but the problem has continued to exist in the past for a downshift.

Many attempts have in the past been made to solve these problems, especially with respect to earth mover equipment, but insofar as we are aware, they have not been entirely satisfactory. When synchronizers have been used, they have necessarily been very large in order to handle the loads imposed thereon and have accordingly occupied a great deal of space. Further, even with the largest synchronizers which have been feasible, the problem of engine speed control in a downshift has remained and the shifting operations have at best been difficult for even a skilled operator to effect.

Other attempts to provide ratio changing equipment for high-load, low speed apparatus, have employed torque converters. These have been satisfactory from the standpoint of smoothness of ratio changing but the power losses which are normal to torque converters under heavy loads have been of such magnitude that it is desirable to utilize positive drive through interengaging teeth for providing the required drive ratios if possible.

A further problem in many kinds of transmission control apparatus arises from the use of a pressure fluid (such as compressed air or vacuum) responsive apparatus for effecting movement of the transmission parts and the use of electrically energized devices for sensing and/or initiating the operation of the pressure fluid responsive apparatus. This requires the maintenance personnel to have knowledge of both pressure fluid and electrical systems, together with the tools and equipment necessary for testing and repairing both kinds of systems. It is evident that if only a single type of energy transmission system is utilized, the maintenance problems are correspondingly simplified. Further, since much of the equipment with which transmissions are used, such as heavy duty highway trucks, are already supplied with either vacuum or compressed air equipment for operating their brakes and since maintenance personnel are therefore already trained in the examination and repair of pressure fluid systems, such simplification can best be carried out by having the transmission control designed as an all pressure fluid responsive system.

A further problem arising in connection with a shift control mechanism is that only a reasonably skilled operator can reliably judge the length of time, if any, to hesitate in neutral position during a shifting operation before proceeding into the next desired gear position. This hesitation is for the purpose of enabling the transmission parts to attain the speeds appropriate for entering the new gear position without undue clash or shock, and may range anywhere from none (that is, the time during which the gears are in neutral with the shift lever moving through neutral as rapidly as possible) in the case of an extremely fast shift under heavy load to several tenths of a second, or even a few seconds, in cases involving a lighter load. Accordingly, this hesitation is an extremely delicate part of the shifting maneuver and, particularly where an extremely fast shift is being attempted, it is a critical part of the shifting maneuver, because if it is too short the gears will rake and if it is too long it may not be possible to enter into the new gear position at all. Therefore, it is desirable to provide a shift control mechanism in which the operator may move the selector as quickly as he can from one gear position to the next and the shift control mechanism will itself provide sufficient hesitation of the transmission parts in neutral position to permit the transmission parts to attain the desired speed condition before proceeding into the new gear position.

Therefore, the principal objects of the invention are:

(1) to provide an improved shift control apparatus particularly applicable to transmissions which operate under high-load, low-speed conditions, such as heavy duty truck and/or earth mover transmissions;

(2) to provide an improved shift control apparatus, as aforesaid, for a transmission utilizing positively interengageable toothed members and wherein the drive ratios of said transmission may be changed by shifting said toothed members into and out of engagement;

(3) to provide an improved shift control apparatus, as aforesaid, in which the shifting of the transmission may be carried out smoothly under conditions of high load and low speed and without appreciably raking the teeth of the interengageable toothed members;

(4) to provide an improved shift control apparatus, as aforesaid, in which the shifting operation can be carried out at such an extremely high rate of speed that it will be completed before an appreciable change in the speed of the output shaft of the transmission will have taken place, even under low-speed, high-load conditions;

(5) to provide an improved shift control apparatus, as aforesaid, which in many cases entirely eliminates the need for synchronizers with the consequent saving both in the space occupied by them and in the maintenance time and expense incident to their use;

(6) to provide an improved shift control apparatus, as aforesaid, in which the entire shift control apparatus is air operated so that maintenance problems are simplified by using only a single type of energy transmitting medium;

(7) to provide an improved shift control apparatus, as aforesaid, in which the operator merely selects the ratio into which a shift is desired by moving a small selector device to the appropriate position and the remainder of the shifting operation is carried out automatically and entirely without the operator's supervision and beyond his power to interfere. In this way, even the least experienced operator can accomplish shifts of heavy duty equipment merely by moving the selector device to the desired position and the apparatus will not require further assistance from the operator and it will not respond to attempted interference on his part;

(8) to provide an improved shift control apparatus, as aforesaid, in which the manually controlled selector device may be moved directly from one gear position to the next gear position and the control apparatus will itself cause the transmission mechanism to hesitate in neutral position for a period of time long enough to enable the transmission parts to attain speeds appropriate to the new gear position before the parts continue the sequence of movements and move into the new gear position;

(9) to provide an improved shift control apparatus, as aforesaid, which gives the operator complete manual control over the selection of the gear positions into which the transmission may be placed but no control whatever over the steps by which the shift of the transmission parts is carried out once a selection is made;

(10) to provide an improved shift control apparatus, as aforesaid, which can be operated to skip shifts on either an upshift or a downshift and in any number without appreciably slowing the rate at which said shift is carried out and without appreciable raking of the toothed members so shifted;

(11) to provide an improved shift control apparatus, as aforesaid, which can be constructed as a completely separate unit from the transmission itself in order that an entire control unit may be removed from the transmission for maintenance purposes and replaced by another control unit, if desired, whereby the vehicle will not necessarily be held out of operation while repairs are being made on a particular shift control apparatus;

(12) to provide an improved shift control apparatus, as aforesaid, which uses standard, easily replaceable parts wherever possible and which has a minimum number of moving parts other than in the valves and thereby further minimizes overall maintenance requirements and the cost of making repairs when same become necessary;

(13) to provide an improved shift control apparatus, as aforesaid, which will give long, satisfactory and maintenance-free operation even under conditions of rigorous use;

(14) to provide an improved shift control apparatus, as aforesaid, which will carry out the objects and purposes above set forth and yet which can be manufactured and installed on appropriate transmissions at a minimum of expense; and

(15) to provide an improved shift control apparatus, as aforesaid, whose operations will be readily understood and will, accordingly, not require lengthy special instruction or training of the operator.

Additional objects and purposes of the invention will become apparent to persons acquainted with apparatus of this general type upon reading the following disclosure and inspecting the accompanying drawings.

Figure 2:
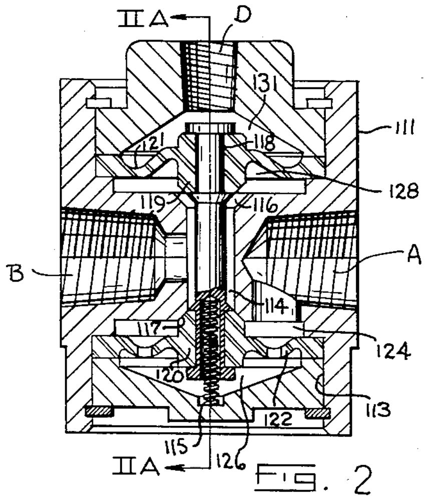
Figure 2 is a central sectional view showing a standard type of valve utilized in the apparatus.
Figure 2A:
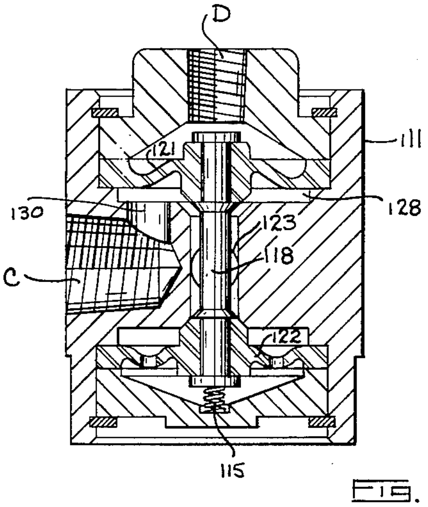

Figure 2*a* is a sectional view taken on the line II*a*—II*a* of Figure 2.

Figure 3:
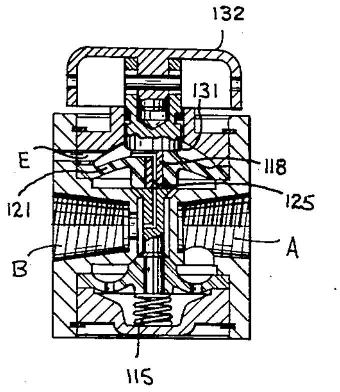

Figure 3 is a central sectional view showing another type of valve utilized in the apparatus.

Figure 4:
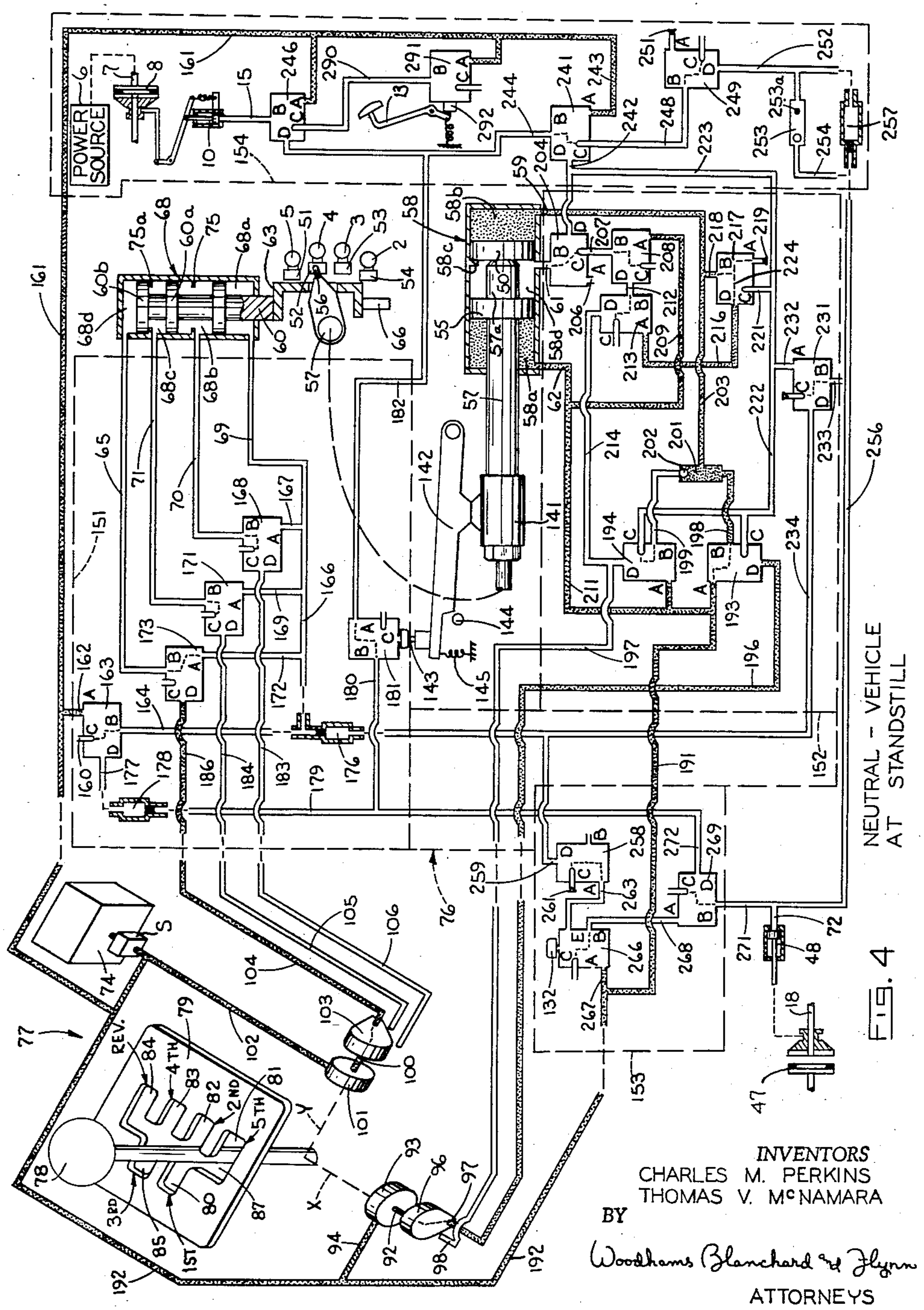

Figure 4 is a diagrammatic view primarily of the fluid pressure circuit and showing the position and condition of the parts when the transmission is in neutral position with the vehicle stopped and preparatory to shifting into a ratio position, such as into first gear.

Figure 5:
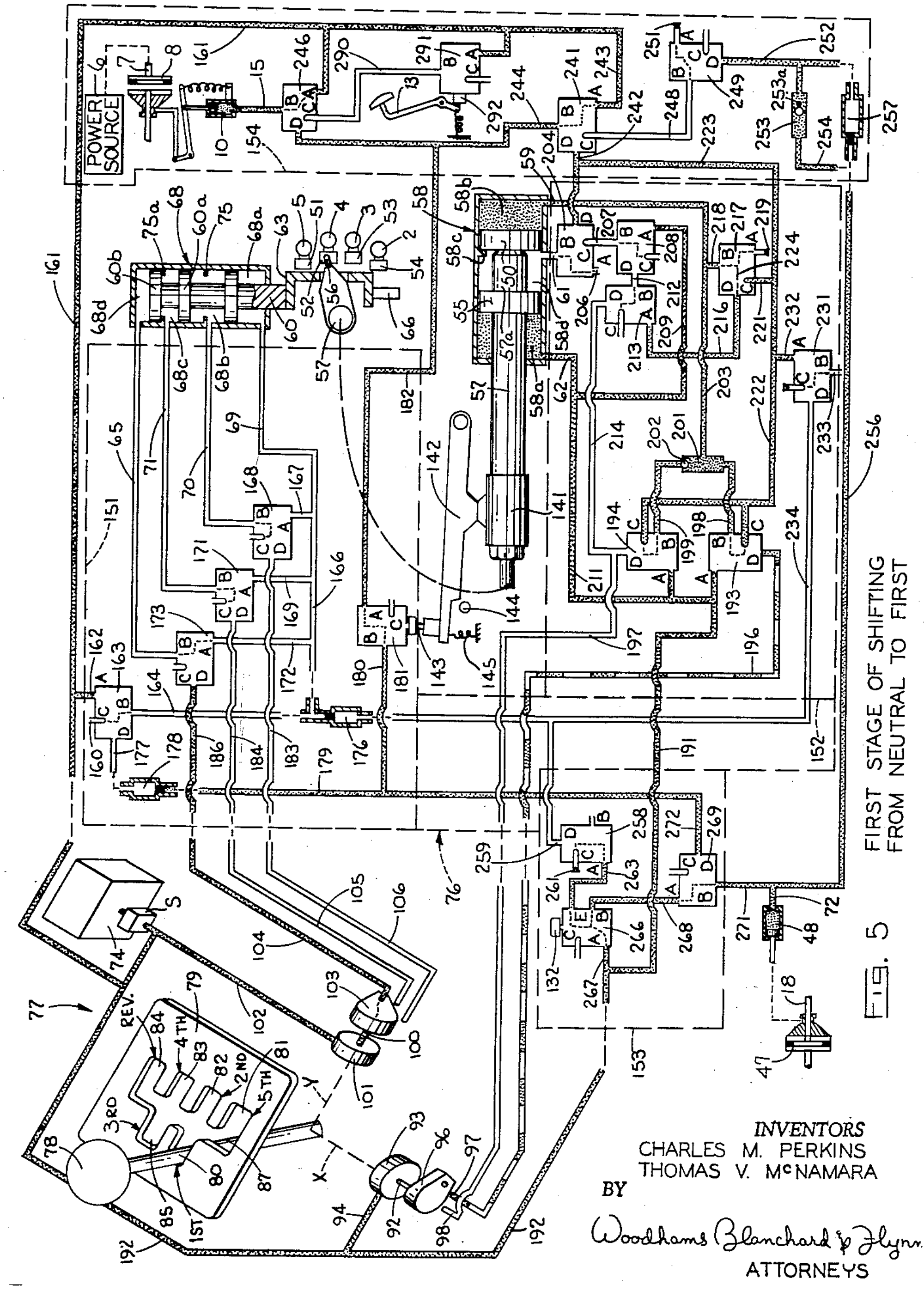

Figure 5 is a diagrammatic view similar to Figure 4 showing the position and condition of the parts when a shift into first gear from a standstill condition is partially completed.

Figure 6:
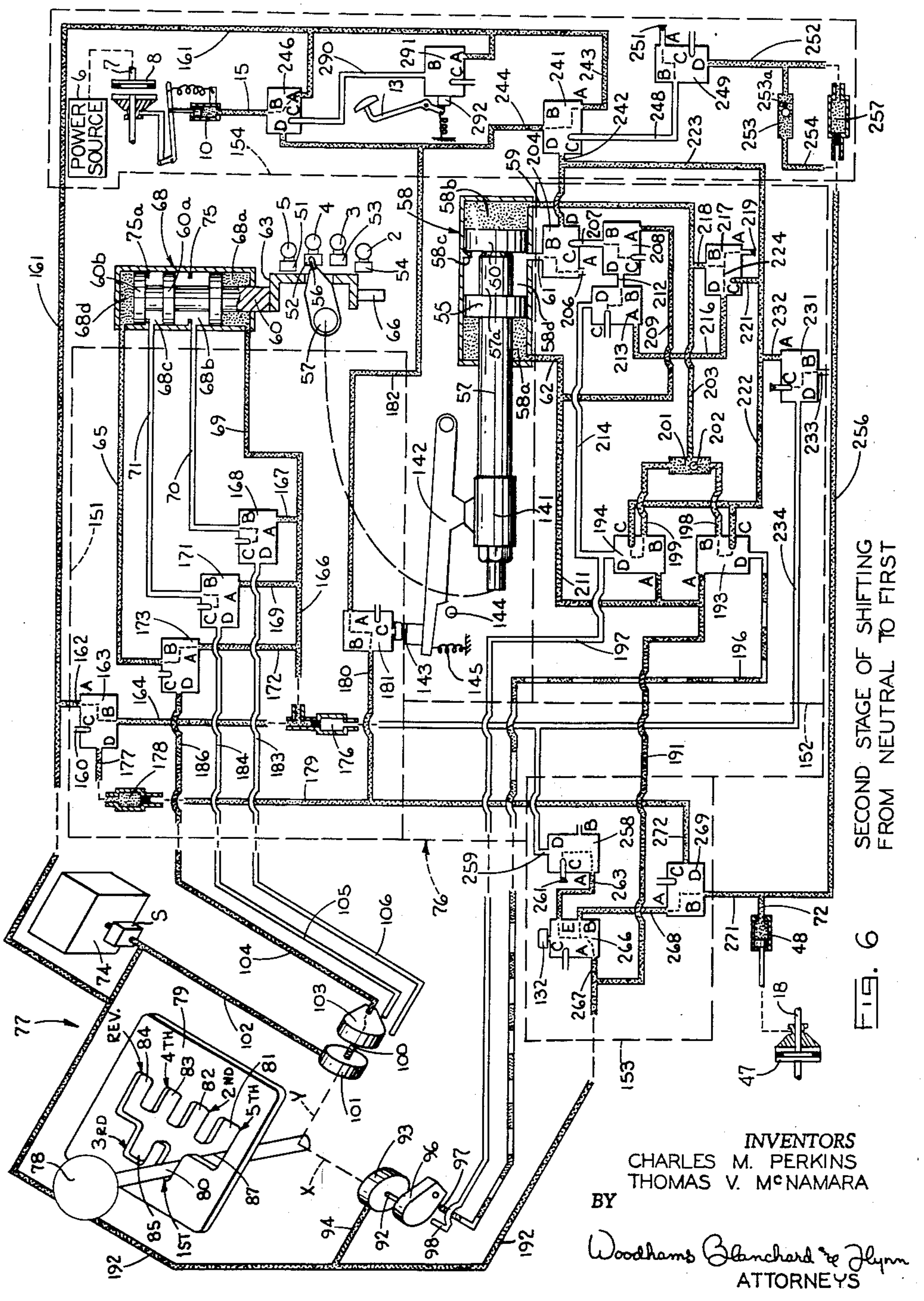

Figure 6 is a diagrammatic view similar to Figure 5 showing a subsequent position and condition of the parts during the shift from a standstill condition into first gear.

Figure 6A:
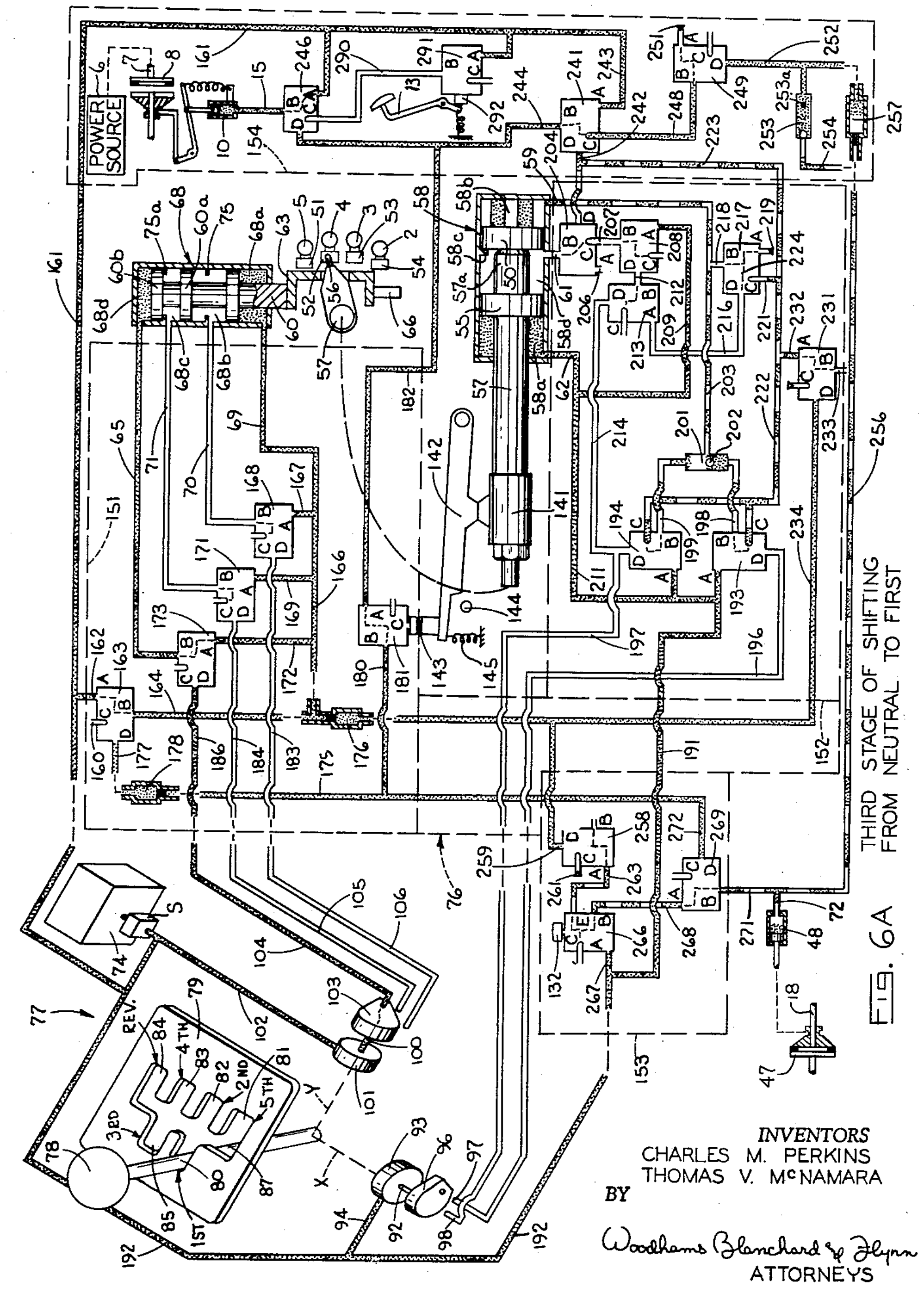

Figure 6*a* is a diagrammatic view similar to Figure 6 showing a later position and condition of the parts during the shift from a standstill condition into first gear.

Figure 6B:
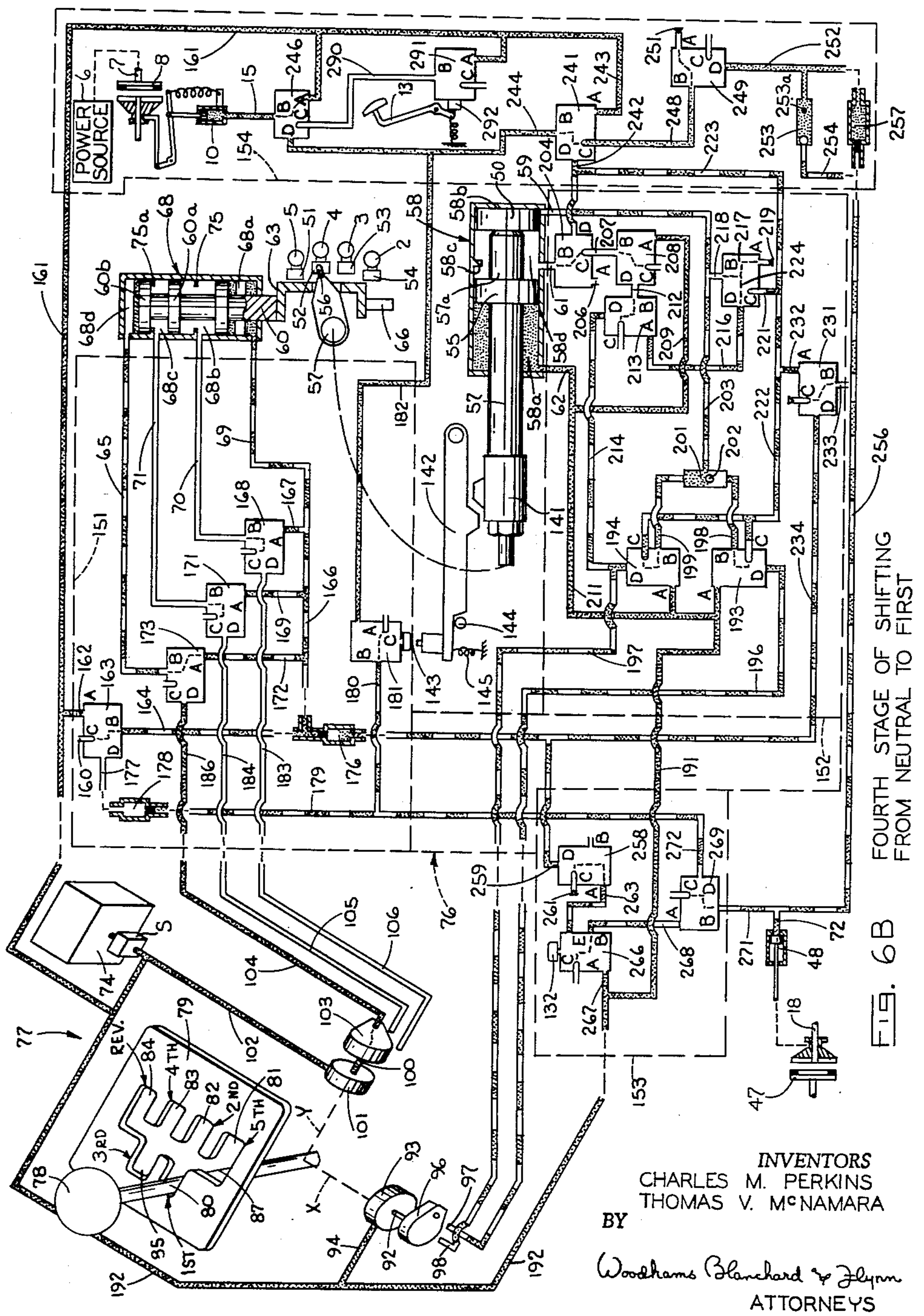

Figure 6*b* is a diagrammatic view similar to Figure 6*a* showing a still later position and condition of the parts during such a shift.

Figure 7:
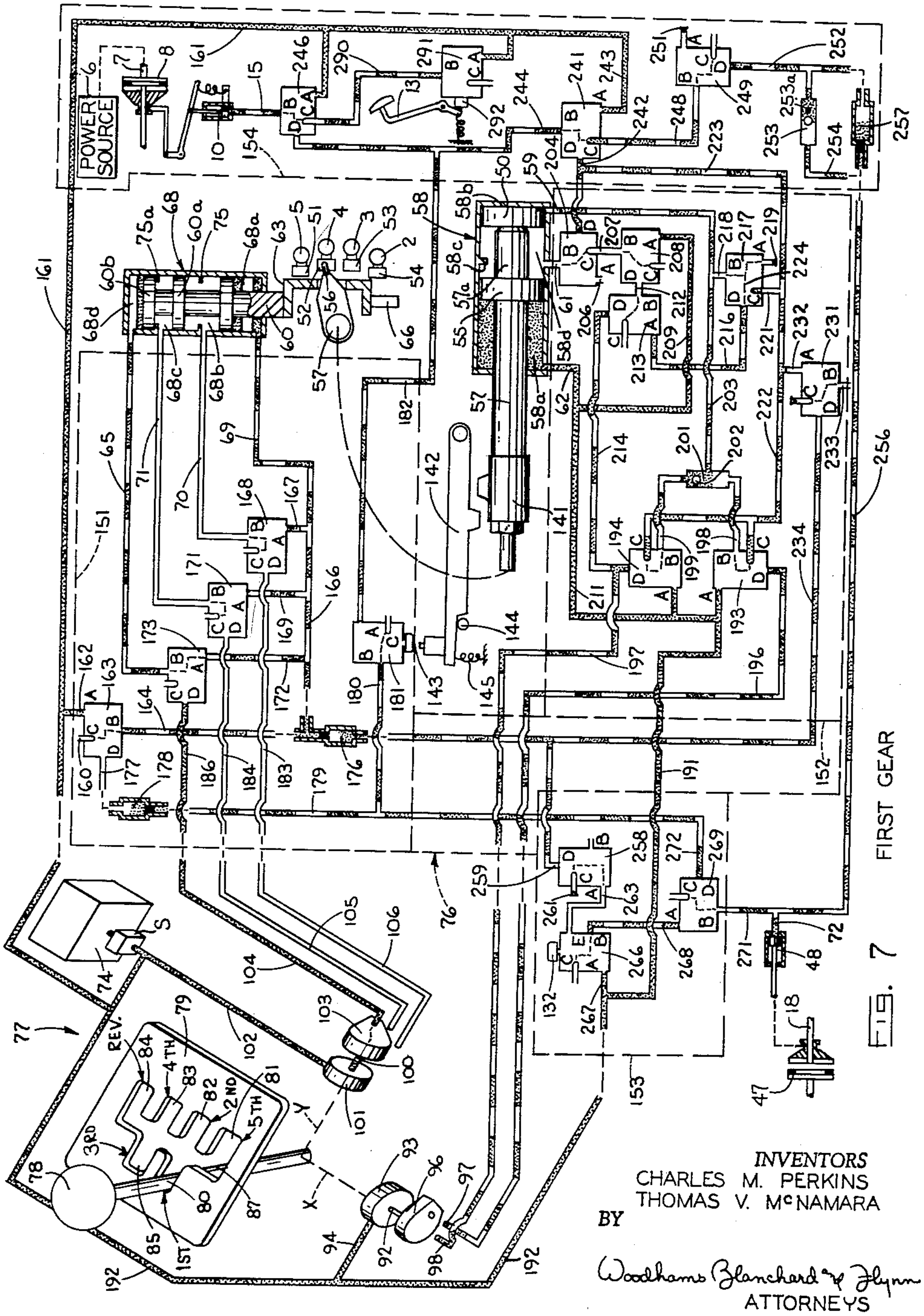

Figure 7 is a diagrammatic view showing the position and condition of the parts upon completion of the shift into first gear.

Figure 8:
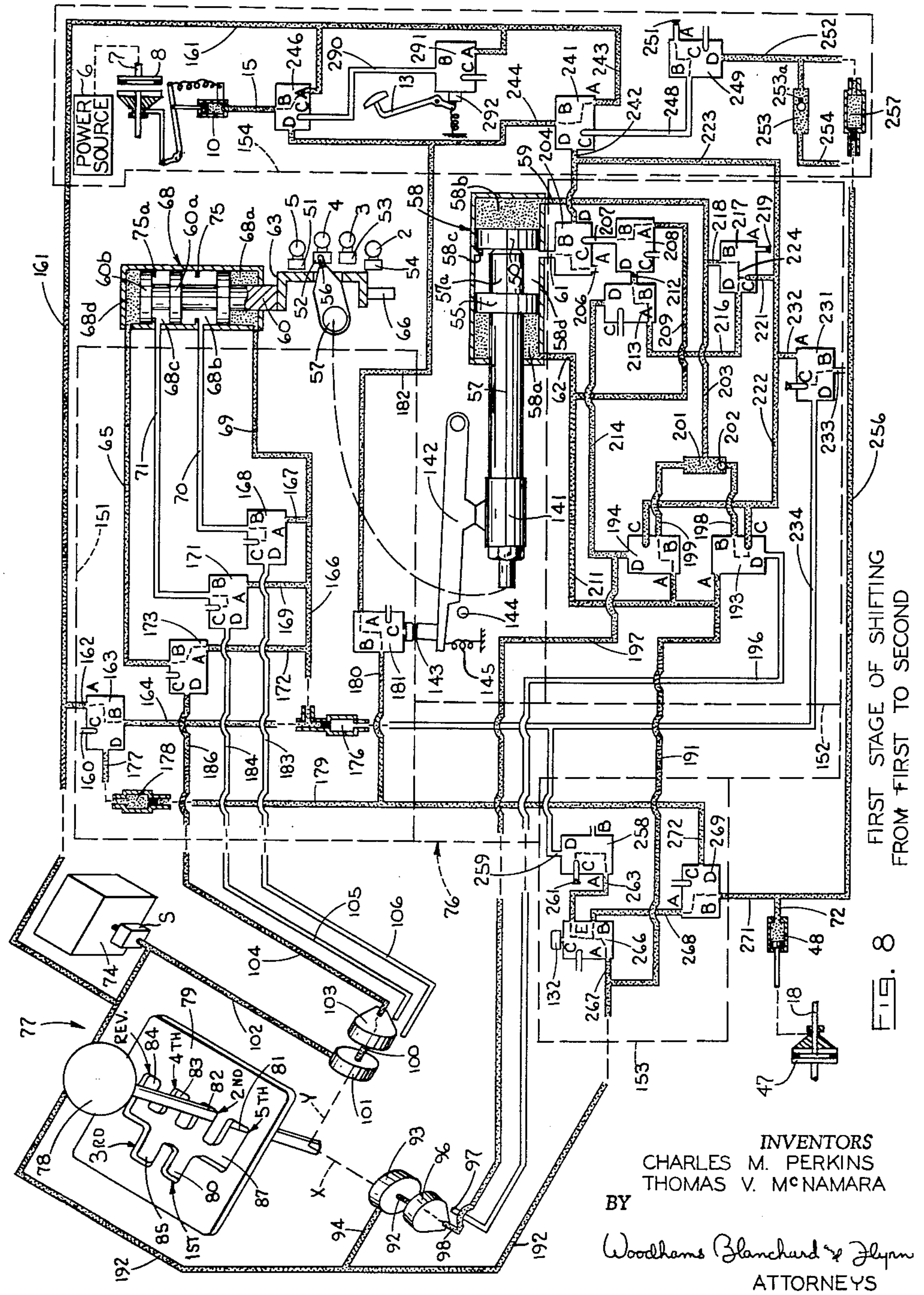

Figure 8 is a diagrammatic view showing the position and condition of the parts upon movement of the manually operated selector into second gear position during a shift from first gear but before complete response of the transmission parts has taken place.

Figure 9:
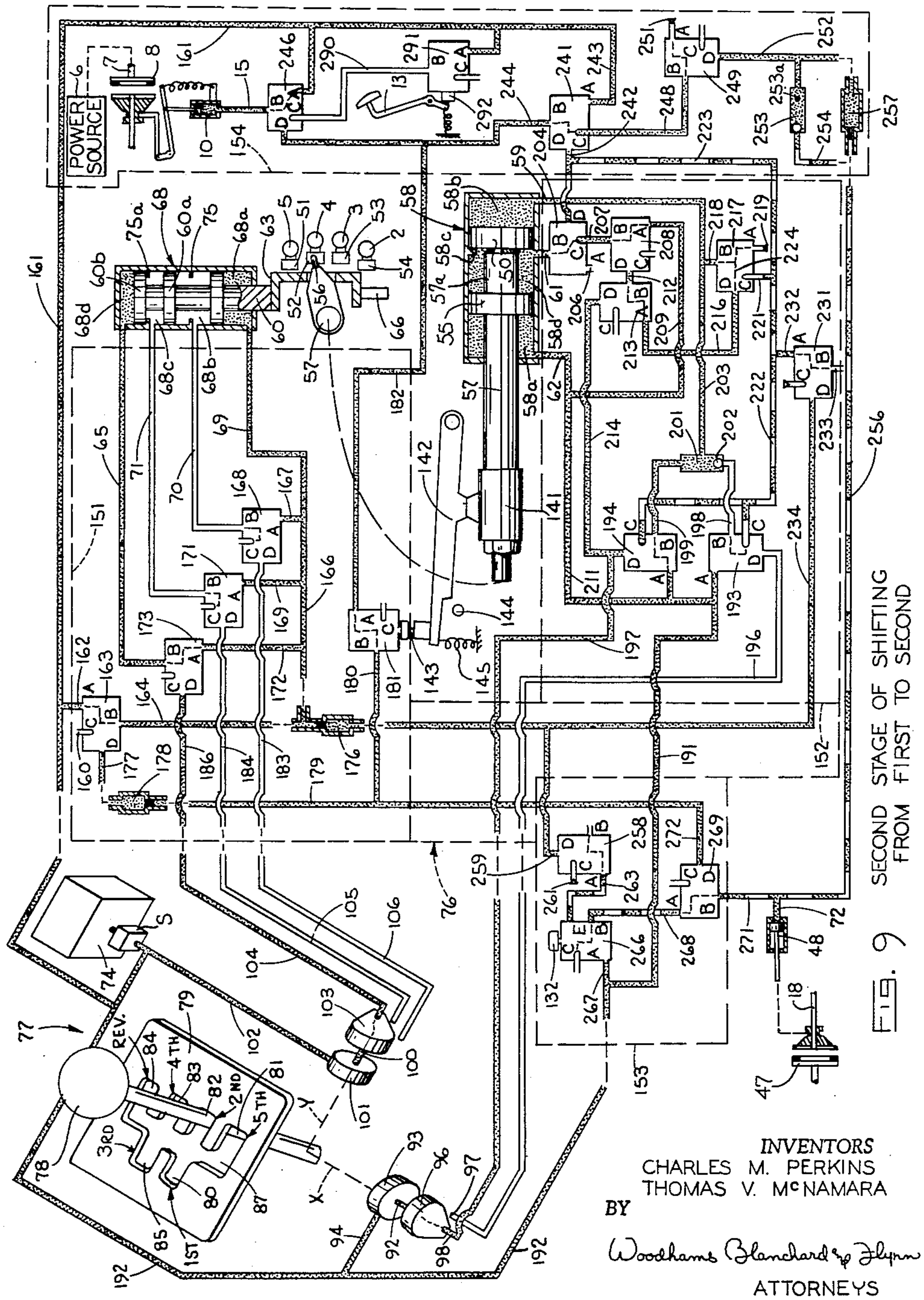

Figure 9 is a diagrammatic view showing a subsequent condition and position of the parts in a shift from first gear to second gear while the vehicle is moving.

Figure 10:
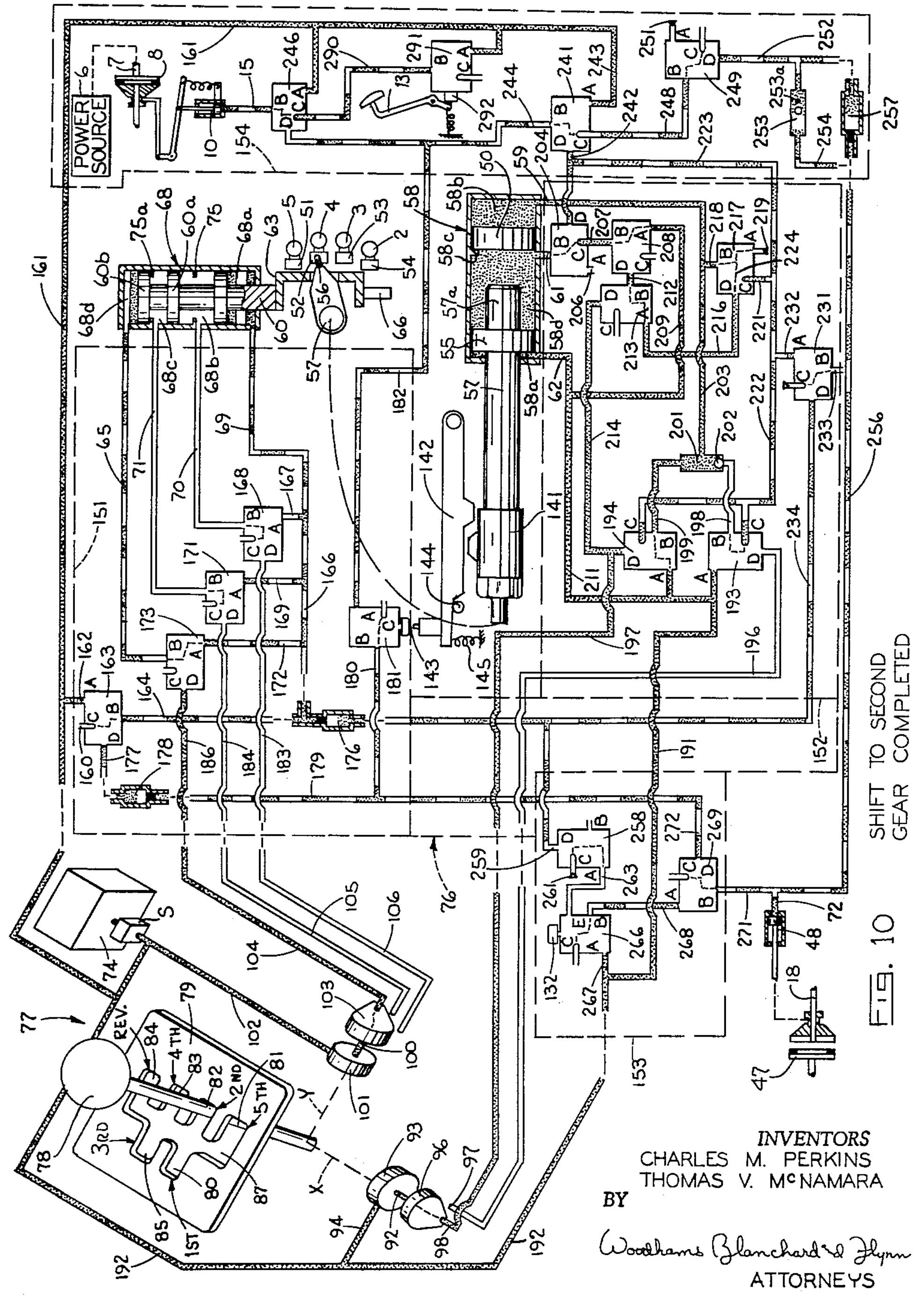

Figure 10 is a diagrammatic view showing the condition and position of the parts upon completion of the upshift into second gear.

Figure 11 is a diagrammatic view showing the position and condition of the parts upon holding the selector in neutral position following a shifted position with the vehicle moving, said position and condition being taken partway through a neutral cycle as hereinafter defined.

In the following description certain terminology will be used for convenience in reference but it will be understood that such terminology is employed for convenience only and has no limiting significance. For example, the terms "rightward," "leftward," "upward," "downward" and derivatives thereof and words of similar import will refer to rightward or leftward, upward or downward, directions in the drawings to which reference is made in connection with the use of such terms. The term "pressure source" may refer to either a source of super-atmospheric pressure or in the case of a vacuum system it may refer merely to the atmosphere but in any event it refers to the high pressure side of the pressure system.

GENERAL DESCRIPTION

In general, apparatus embodying the invention includes (1) a fluid pressure power system and (2) selector means for selectively connecting said power system for shifting a desired one of the transmission shift rods. Upon manual initiation, the power system operates first to move the transmission into neutral position. An automatic selector then acts, if appropriate, to connect the power system to the correct shift rod for the next shift. Timeable means are simultaneously actuated and caused to time out for measuring the time during which the transmission remains in neutral. The power system is then automatically again energized to move the transmission into the next selected gear.

Manually operable selector means are provided for initiating the operation of the entire apparatus and for controlling the selection made by the automatic selector. Further apparatus is incorporated into the power system for operating the driving clutch of the vehicle at appropriate points in the sequence together with apparatus for applying and subsequently releasing a countershaft brake at appropriate points in the operation of the system.

DETAILED DESCRIPTION

*Mechanical structure*

Inasmuch as the invention lies primarily in the control system associated with the transmission apparatus, the components of much of the mechanical structure may include many presently known devices. Thus, the hereinafter described mechanical apparatus is widely variable within the scope of the invention and may be replaced by other apparatus of generally similar function without departing from the objects, purposes or scope of the invention.

Figure 1:
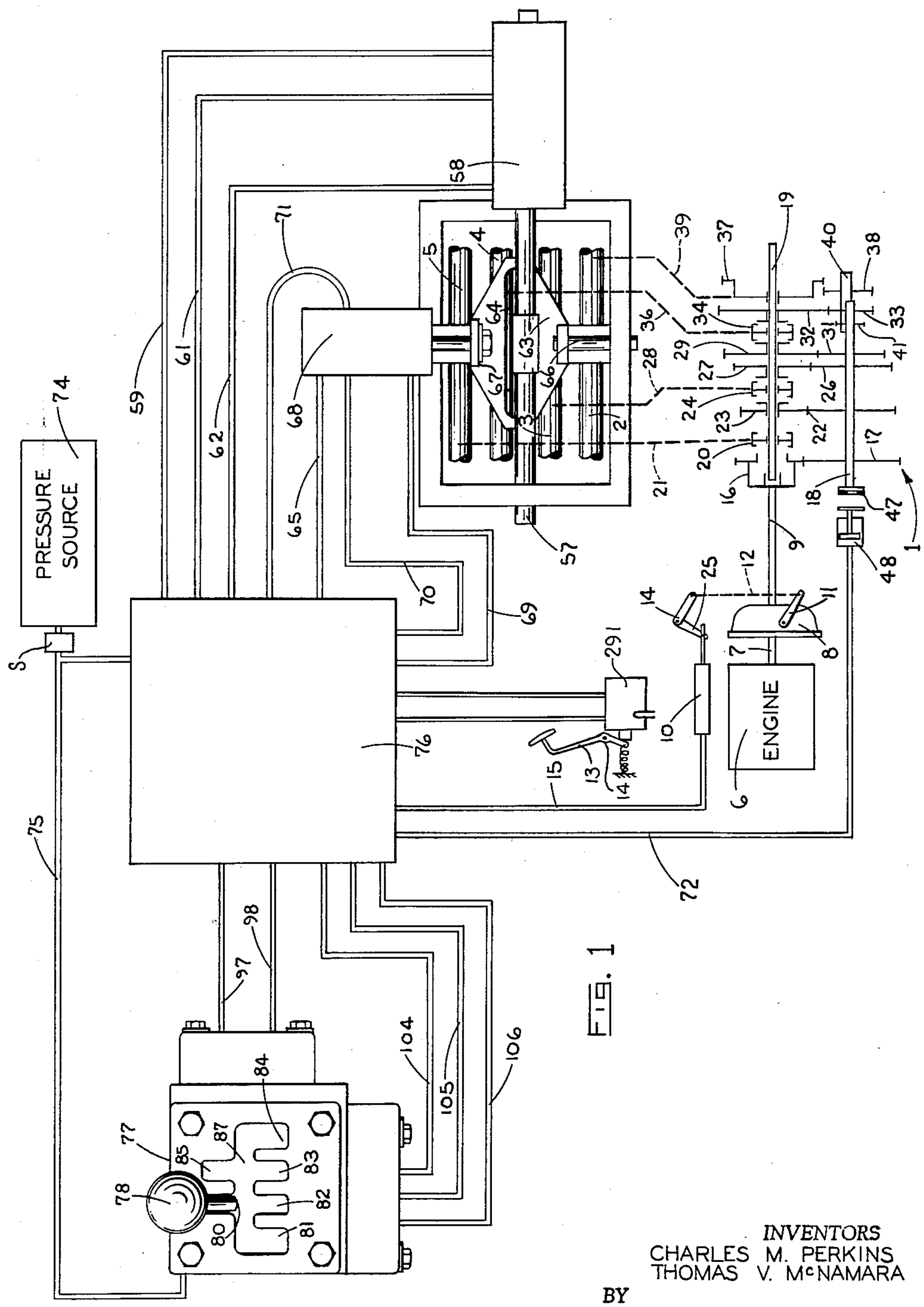
Figure 1 is a schematic view showing a typical transmission assembly embodying the invention and showing the manner of applying the transmission control to the shift rods of the transmission.

Referring first to Figure 1 which illustrates the general organization of the apparatus, there is provided a transmission assembly 1 which includes a suitable change gear transmission whose ratios are selectable by operation of shift rods 2, 3, 4 and 5. While the change gear transmission may be any one of many known types, such as that shown in Patent No. 2,637,221 by way of specific example, the one specific schematically illustrated change gear transmission here chosen for illustrative purposes will be described for clarity and completeness of disclosure. Thus, there is shown a power source 6, which may be an automotive engine, having an output shaft 7 connected through a clutch 8 to a transmission input shaft 9. The clutch 8 is operated by the usual clutch arm 11 through linkage 12 from any manually or pedally operated device, such as a foot pedal 13, pivoted at 14 to the frame of a vehicle.

The transmission input shaft 9 is connected to and drives an input gear 16 which is in permanent mesh with the first countershaft gear 17. The gear 17 is mounted on, and for rotation with, the countershaft 18 which is supported by suitable bearings (not shown) in a conventional manner. A transmission main shaft 19 is piloted at its leftward end in the gear 16 and is rotatably supported at its rightward end by a suitable bearing (not shown). A first sliding device 20, such as a toothed clutch ring, is slidably but nonrotatably mounted on the shaft 19 and is adapted for selective meshing engagement with gear 16 to alternately drivingly connect or disconnect said shaft directly to the input shaft 9. When gear 16 is in mesh with device 20, the transmission will be in 5th speed. Suitable linkage 21 is provided for actuating the device 20, which linkage will conveniently be a shift fork connected to the shift rod 5. A second countershaft gear 22 is permanently meshed with a fourth speed gear 23, which latter is mounted on, and for free rotation with respect to, the main shaft 19. A third countershaft gear 26 is permanently meshed with a third speed gear 27, said latter being mounted on and for free rotation with respect to the shaft 19. A second sliding device 24, which is slidable axially along the main shaft 19 but is nonrotatable with respect thereto, is movable between positions where it meshingly engages either the fourth speed gear 23 or the third speed gear 27 for clutching one of said gears to the main shaft 19. A mechanical linkage 28, usually an ordinary shift fork, connects the slidable device 24 with the shift rod 3.

A second speed gear 29 is mounted on and is rotatable with respect to the main shaft 19 and is in constant mesh with a third countershaft gear 31. A first speed gear 32 is mounted on and is rotatable with respect to the main shaft 19 and is in constant mesh with a fourth countershaft gear 33. A third sliding device 34 is slidably but nonrotatably mounted on the main shaft 19 and upon axial movement in one direction or the other with respect to said main shaft alternately clutches the gear 29 or the gear 32 to said main shaft. Suitable linkage 36, usually an ordinary shift fork, is provided for connecting the slidable device 34 to the shift rod 4.

A reverse gear 37 is slidably but nonrotatably mounted on the main shaft 19. A reverse shaft 40 is driven from the countershaft 18 in any convenient manner, such as by gearing indicated generally at 41, and it has a reverse drive gear 38 mounted thereon. Leftward movement of the reverse gear 37 engages same with the reverse drive gear 38. Suitable mechanical means 39, which will normally comprise an ordinary shift fork, connects the reverse gear 37 to the shift rod 2.

The countershaft 18 of the transmission is provided with a brake 47 of any conventional and convenient type, such as a brake comprising a plurality of interleaved plates, part of which are mounted on and for rotation with the countershaft 18 and the remainder of which are held against rotation with said countershaft by the frame of the vehicle. Suitable fluid pressure operated means, such as a conventional fluid pressure operated piston and cylinder 48, is provided to cause engagement of the brake 47 when fluid pressure is supplied thereto.

A fluid pressure operated piston and cylinder 10 is connected through suitable linkage 25 to operate the clutch 8 in response to pressurizing of the line 15.

The shift rods 2, 3, 4 and 5 are supported for axial sliding movement by any conventional means and carry conventional shift yokes as schematically indicated at 51, 52, 53 and 54 (Figures 4–11). A finger 56 is mounted on a slidable and rotatable power rod 57 and is adapted to enter into said shift yokes, one at a time, to drivingly connect said rod 57 to a selected one of the shift rods 2, 3, 4 and 5.

The specific means by which the power rod 57 is operated may take any of several known forms, one suitable form being set forth in detail in the application of Thomas Backus, Serial No. 700,123, now Patent No. 2,931,237, dated April 5, 1960, assigned to the same assignee as the present application. However, for convenient reference purposes, a brief description thereof will be supplied herein.

The power rod 57 is movable axially by a pressure responsive device, which is here shown as a power cylinder 58 supplied by three fluid pressure lines 59, 61 and 62 (Figures 1 and 4–11). The power rod 57 has a piston 55 thereon and an extension **57*a* extending rightwardly beyond said piston, said piston and said extension both being received within said power cylinder. A second piston 50 which is independent of the power rod 57 is slidable between the rightward end of the cylinder and a fixed stop 58*c*. The pistons 50 and 55 define three chambers 58*a*, 58*b* and 58*d*. The application of pressure fluid in line 59 will move piston 50 leftwardly against the stop 58*c* and thereby move the power rod 57, even though line 62 is pressurized, from the rightward end of its travel in a leftward direction to a neutral or center position substantially halfway between the rightward and leftward ends of its travel thereby moving whichever shift rod is engaged by the finger 56 into neutral position; pressurizing of line 61 will move said power rod into its extreme leftward end position, even though line 62 is pressurized, to thereby move the shift rod engaged by said finger into the leftward shifted position; pressurizing of the line 62, depressurizing of the line 61 and pressurizing of the line 59 will move said power rod 57 from its leftward end position into its neutral position and subsequent depressurizing of line 59** will move said power rod rightwardly into its rightward end position and thereby move the engaged one of said shift rods into its rightward shifted position.

Suitable mechanism is provided for moving the finger 56 into engagement with a selected one of the yokes 51, 52, 53 and 54. In this particular embodiment, a plate 63 is provided with a slot 64 through which the finger 56 extends. The plate 63 is slidably mounted for reciprocal movement in a direction transverse to the shift rods 2, 3, 4 and 5 by means including a rod 66 supporting one side of the plate 63. The other side of said plate 63 is supported at 67 (Figure 1) on and by a reciprocable piston 60 (Figures 4–11) which is slidably received within a selector cylinder 68. A pair of additional serially arranged pistons **60*a*, 60*b* are located in the selector cylinder 68 and are arranged in series with piston 60 and are capable of movement independently of each other. The pistons 60, 60*a* and 60*b* define four chambers 68*a*, 68*b*, 68*c* and 68*d* within the selector cylinder 68. Stops 75 and 75*a* are secured to the interior wall of cylinder 68 for limiting movement of the pistons 60*a* and 60*b*, respectively, toward the shift rods 2, 3, 4 and 5. The selector cylinder 68 is supplied with fluid pressure from the lines 65, 69, 70 and 71 which communicate with the chambers 68*d*, 68*a*, 68*b* and 68*c***, respectively.

A full description of the operation of cylinder 68 appears in said application Serial No. 700,123, but its operation may be briefly summarized as follows: with line 69 pressurized, the depressurizing of the other lines 65, 70 and 71 will move the finger 56 into engagement with the shift rod 5; pressurizing of the line 64 will move said finger into engagement with the shift rod 4, even if line 69 is pressurized; pressurizing of the line 71 will move said finger into engagement with the shift rod 3, even if line 69 is pressurized; and pressurizing of the line 70 will move the finger into engagement with the shift rod 2, even if the line 69 is pressurized. It will be recognized that there is no position in which the finger 56 is not in engagement with at least one of said shift rods.

The pressure lines 59, 61 and 62 for pressurizing the cylinder 58, the lines 65, 69, 70 and 71 for pressurizing the cylinder 68, the line 72 for pressurizing the countershaft brake cylinder 48 and the line 15 for pressurizing the clutch cylinder 10 are all supplied from a pressure source 74 through a suitable control device 76, said control device being further described hereinafter.

While the pressure source 74 will be hereinafter assumed as compressed air for purposes of convenience, it will be recognized that other sources of pressure differential of known types and particularly including vacuum may be utilized within the scope of the invention. Hence, the reference hereinafter to super-atmospheric gaseous pressure is for illustration purposes only and is not limiting.

A manually responsive control device 77 selects and initiates operation of the rest of the apparatus. One suitable device for this purpose is described in detail in said application Serial No. 700,128, but will be hereinafter described briefly for purposes of convenient reference.

A manually operable selector device 78 is pivotally mounted for pivoting around both of the axes X and Y. The selector device 78 extends through a plate 79 having parallel slots 80, 81, 82, 83, 84 and 85 therein arranged as shown in Figures 4 through 11. As will become apparent hereinafter, when the selector 78 is in slot 80, the transmission will be placed in first gear condition and slots 82, 85, 83, 81 and 84 will similarly provide the second, third, fourth, fifth and reverse gear conditions, respectively. The slots 80 through 84 open at their adjacent ends into a transversely extending passageway 87 and, when the selector is in said passageway, the transmission will be placed in neutral.

Pivotal movement of the selector device about the axis X will effect rotation of a tubular conduit 92 which is pressurized through a suitable manifold 93 from an inlet conduit 94 and correspondingly rotates a pressure fluid distributor 96. The distributor 96 will conduct pressure from the tubular conduit 92 either into the line 97 when it is aligned therewith or into the line 98 when it is aligned therewith. When the distributor 96 is out of alignment with either or both of the lines 97 and 98, the line with which it is not aligned is open to the atmosphere. Thus, when the selector 78 is in either of the slots 80 or 85, the distributor 96 is not connected with either the line 98 or line 97 and both said lines are open to the atmosphere. When the selector is in the passageway 87, the distributor 96 is connected with the line 97 and the line 98 is open to the atmosphere. When the selector 78 is in any of the slots 81 to 84, inclusive, the distributor 96 is connected with line 98 and line 97 is open to the atmosphere.

When the selector device 78 is rotated about the axis Y, it will effect rotation of the tubular conduit 100 which is supplied with pressure fluid through the manifold 101 from an inlet conduit 102. The tubular conduit 100 is connected to a distributor 103 which may be moved into alignment with any one or none of the lines 104, 105 and 106. Thus, when the selector device 78 is in or aligned with the slot 81, the distributor 103 is out of alignment with all of the lines 104, 105 and 106 and said lines are each open to the atmosphere. When the selector device 78 is in or aligned with the slot 82, the distributor 103 is aligned with the line 104 and lines 105 and 106 are open to the atmosphere. When the selector device 78 is in or aligned with the slot 83 the distributor is aligned with the line 105 and lines 104 and 106 are open to the atmosphere. When the manual selector 78 is in or aligned with the slot 84 the distributor 103 is in alignment with the line 106 and the lines 104 and 105 are open to the atmosphere. The pressure source 74 is suitably connected to the lines 94 and 102 of the control device 77 for purposes appearing hereinafter.

The power rod 57 carries a cam 141 which acts through suitable means, as a lever 142, for mechanically operating the valve actuator 143. The lever 142 is moved into its upward position as shown in Figures 4, 5, and 6 and others when the power rod 57 is in its center position corresponding to neutral position of the transmission gears. When the power rod 57 is in a rightward or leftward position, corresponding to a shifted position of a shift rod, then the cam 141 is disengaged from the lever 142 and said lever drops (assisted if desired by a spring 145) into an inactive position against a suitable stop means, such as a pin 144.

While the valves used in the preferred embodiment of the invention are known types of valves, a brief description thereof will facilitate an understanding of their operation and make possible for convenience the use of a more schematic reference to said valves in the drawings and the description relating to the fluid pressure system as a whole.

Referring to Figure 2, there is shown a valve body 111 having an inlet port A and a central opening 113 including an internal passageway 114. The ends of the internal passageway 114 are beveled to provide valve seats 116 and 117. A valve stem 118 extends through the passageway 114 and carries valve elements 119 and 120, which valve elements have beveled ends for sealing engagement with the valve seats 116 and 117, respectively. The valve elements 119 and 120 are connected to diaphragms 121 and 122 respectively, diaphragm 121 being imperforate and diaphragm 122 being perforate. The valve stem 118 preferably is normally urged upwardly to close valve 120 against valve seat 117 by a spring 115.

A cylinder or outlet port B communicates with the passageway 114 and the inlet port A communicates through a passageway 124 and through the perforations in the diaphragm 122 with an end chamber 126. An exhaust port C (Figure 2*a*) is connected by a passageway 130 with chamber 128 on the axially inner side of diaphragm 121. A control port D extends from the exterior of the valve into the chamber 131 which is on the axially outer side of diaphragm 121. When suitable pressure is applied through control port D, the valve stem 118 will be moved downwardly to close valve 119 against valve seat 116 and to move valve 120 away from valve seat 117.

When the control port D is pressurized and the valve stem 118 is in its downward position, fluid passes through the port A, through the passageway 124, thence past the valve seat 117 into the passageway 114 and out through the cylinder port B. Under these conditions, the valve element 119 is closed against the valve seat 116 and pressure fluid cannot pass into the chamber 128 and out through the exhaust port C. When the control port D is depressurized, the spring 115, augmented by pressure from the inlet 112 which passes through the perforations in the diaphragm 122 into the chamber 126 and acts against the lower surface of said diaphragm 122, closes the valve element 120 against the valve seat 117. Closure of the valve element 120 against the valve seat 117 moves the valve element 119 from the valve seat 116 and permits fluid to exhaust from the cylinder port B through the central passageway 114 into the chamber 128 and out through the exhaust port C. Thus, the valve will be held under positive control at all times, in one position by pressure from the control port D and in the other position by pressure from the inlet port 112, assisted by the spring 115 where said spring is used.

In Figure 3 there is shown a modification of the valve described and illustrated in Figure 2 which is adapted for manual or mechanical actuation in place of the pressure actuation of the valve of Figure 2. This valve seat has for the most part the same construction shown and described in connection with Figure 2 and is numbered correspondingly. However, in place of the control port D for effecting positive downward movement of the valve stem 118, such positive downward movement of the valve stem 118 is effected by a mechanical downward actuation of the cap 132. The cap 132 is mounted to bear directly against the stem 118 and move said stem downwardly when said cap is manually urged downwardly. A passageway 125 may be provided through the stem of the valve to bleed a limited amount of fluid from the cylinder port B to the chamber 131 above the diaphragm 121. A port E may be provided from the chamber 131 to the exterior of the valve for connection with other means such as that hereinafter further described with respect to valve 266 of the fluid pressure system. In such a case, manual or mechanical depression of the valve stem 118 will admit pressure fluid to the opening 125 and thence to chamber 131. This pressure may be utilized to hold the valve stem 118 in downward position against the combined action of the spring 115, where used, and the pressure from the inlet 112 tending to move said valve stem upwardly until the pressure in chamber 131 is released.

As will be hereinafter further described in connection with valve 217 of the fluid pressure system, a passageway corresponding to passageway 125 in the valve of Figure 3 may be provided through the stem 118 of the valve shown in Figure 2 in which case said passageway communicates with the control port D. Further, the passageway 125 may be omitted from the valve shown in Figure 2, as is the case with valve 181 of the fluid pressure system described hereinafter, so that the valve stem 118 will be returned to its upward position immediately upon removal of the manual or mechanical force on cap 132.

Referring to both forms of valves as shown in Figures 2 and 3, the valve will normally be held in the position shown in Figures 2, 3 and 2*a* wherein port A does not communicate with port B and port B communicates with port C. When pressure is applied through control port D, the valve stem 118 will be shifted so that port A will communicate with port B and port C will not communicate with port B. While ports A, B and C have been referred to hereinabove for convenience as being the inlet, outlet and exhaust ports, respectively, it will become apparent as the description proceeds that said ports are not necessarily connected to the high pressure side and low pressure side of the pressure source and to atmosphere, respectively, but, rather, are connected in such fashion as to provide the desired flow of pressure for the purposes of the invention.

THE PRESSURE FLUID SYSTEM

Turning now to pressure fluid systsm and with reference to the mechanical parts described above, the fluid pressure system includes a selector portion which reacts to pressurizing of the lines 104, 105 and 106 to pressurize one or more of the lines 65, 69, 70 and 71 to cause selection of a shift rod to be shifted. The fluid pressure system also includes a shifting control portion which reacts to pressurizing of the lines 97 and 98 to pressurize one or more of the lines 59, 61 and 62 for effecting shifting of a selected one of the shift rods or for returning a shifted rod to neutral position. The fluid pressure system also includes means for pressurizing and depressurizing the clutch cylinder 10 and for pressurizing and depressurizing the countershaft brake cylinder 48.

While the portions of the pressure fluid system are interrelated with each other and, hence, cannot be specifically isolated from each other, nevertheless, for convenience in reference, it will be convenient to refer to these portions of the pressure fluid system by general terminology. Accordingly, the portion enclosed in the broken line 151 will sometimes be referred to as the selector portion of the control system; the portion enclosed within the broken line 152 will sometimes be referred to as the shift control portion of the control system; the portion enclosed in the broken line 153 will sometimes be referred to as the countershaft brake control portion; and the portion enclosed in the broken line 154 will sometimes be referred to as the clutch control portion.

For simplicity of illustration, the representations of the valves appearing in Figures 4 to 11, inclusive, are schematically shown with the port A of the valve of Figures 2 and 3 appearing at or near one end of the valve, such as at the line 162 of the valve 163. The port B appears between the ends of the valve, as at the line 164 of the valve 163; and the port C appears as overlapping the valve between the ends thereof, as at the line 160 of the valve 163; and the control port D appears as entering through the end of the valve, as at the line 177 of valve 163. Broken lines through the representation of a valve will indicate the connection of the ports of the valve at the particular condition of the apparatus shown in the particlular drawing involved.

*Selector portion*

Referring first to the selector portion 151, a pressure line 161 constantly communicates with the source 74 and a line 162 extends therefrom and is connected to the port A of a valve 163 of the type shown in Figure 2. A line 164 is connected to the port B of the valve 163 and is connected to a line 166 which in turn is connected to (1) a line 69 communicating with chamber 68*a* of the selector cylinder 68, (2) a line 167 connected to the port A of a valve 168, (3) a line 169 connected to the port A of a valve 171, (4) a line 172 connected to the port A of a valve 173, and (5) to the end of a time delay chamber 176 serving as a timer as hereinafter described, said chamber 176 preferably having a metering orifice at its inlet end. The valves 163, 168, 171 and 173 have their respective ports C open to the atmosphere. The control port D of the valve 163 is connected by a line 177 to the outlet of a small time delay chamber 178 functioning as a timer as hereinafter described, and, like chamber 176, preferably having a metering orifice at its inlet end. However, both of these metering orifices are for convenience only and may be dispensed with by using chambers of larger volume. The inlet of chamber 178 is connected by the lines 179 and 180 to the port B of a neutral valve 181, said valve 181 being controlled by the valve actuator 143. The valve 181 is of the construction shown in Figure 3, except that it has no passageway 125, and the actuator 143 of valve 181 corresponds to cap 132 shown in Figure 3. The port A of said valve 181 is connected to a line 182 which is connected and pressurized as hereinafter described.

The port B of the valve 168 is connected to the line 70, the port B of the valve 171 is connected to the line 71, and the port B of the valve 173 is connected to the line 65. The control port D of the valve 168 is connected by a line 183 to the line 106, the control port D of the valve 171 is connected by a line 184 to the line 105 and the control port D of the valve 173 is connected by a line 186 to the line 104.

*Shift control portion*

The shift control portion 152 is continuously supplied with pressure fluid by a line 191 which is connected through a line 192 to the pressure source 74. The line 191 is connected to ports A of valves 193 and 194, respectively, and the control ports D of said valves are connected to lines 196 and 197, respectively. The line 196 is connected to the line 97 of the selector control device and line 197 is connected to the line 98 of the selector control device. The ports B of valves 193 and 194 are connected by lines 198 and 199, respectively, to opposite ends of the small chamber 201 containing a ball check 202. The ball check 202 will block line 199 when line 198 is pressurized, and vice versa, but will not block either line when both are pressurized. A further line 203 extends from the chamber 201 and is connected to the line 59 which, as above described, is connected to the power cylinder 58.

The line 61 to the power cylinder 58 is connected to the port B of a valve 204 whose port A is connected to atmosphere at 206 and whose port C is connected by a line 207 to the port B of a valve 208. The port A of valve 208 is connected by a line 209 to the line 62 for the power cylinder 58 and is also connected by a line 211 to the line 191. The port C of valve 208 opens to the atmosphere. The control port D of valve 208 is connected by a line 212 to the port B of an exhaust valve 213 whose port C opens to the atmosphere and whose control port D is connected by a line 214 to the line 197. The port A of the valve 213 is connected by a line 216 to the control port D of a pulse valve 217 whose port B is connected by a line 218 to the line 203, whose port A is closed at 219 and whose port C is connected by a line 221 to a line 222. Line 222 extends from the ports C of the valves 193 and 194 to a line 223. Line 223 is connected to the control ports D of valves 204 and 241.

The valve 217 has a small bleed passageway 224, indicated by the broken line 224 in Figure 4, drilled through its valve stem in the same manner as passageway 125 in the valve shown in Figure 3. The hole 224 continuously connects the port B to the control port D but is small as compared to either of such ports. The exhaust valve 231 has its port A connected by a line 232 to the line 222, its port B open at 233 to the atmosphere and its control port D connected by the line 234 to the end of the time delay chamber 176 opposite to line 164. Port C of the valve here used is never functional in valve 231 and hence for valve 231 port C may be omitted, plugged or left open as desired.

*The clutch control portion*

The clutch control portion 154 includes a switching valve 241 which has its control port D connected by a line 242 to the line 223 and its port A connected by a line 243 to the pressure supply line 161. The port B of valve 241 is connected by a line 244 to the line 182 and also to the control port D of a clutch valve 246. The port A of the valve 246 is also connected to the pressure supply line 161, port B thereof is connected by a line 15 to the clutch cylinder 10 and port C is in some embodiments open directly to the atmosphere. In this embodiment, however, an auxiliary pedal control is provided for the clutch cylinder 10, particularly for use when starting from a standstill. The port C of valve 246 is connected by a line 290 to port B of a pedally operated valve 291 whose port A is connected to a constant pressure source, such as the line 161, whose port C is open to the atmosphere and whose control is a valve actuator 292 which, like the valve actuator 143 of valve 181, is the same as the button 132 and stem associated therewith shown in Figure 3 with the passageway 125 either omitted or plugged. Thus, there is normally communication from line 290 to the atmosphere, but the operator can at any time depress the clutch pedal 13 and thereby introduce pressure fluid from the line 161 into the line 290 and thence, if valve 246 is not already pressurized at port D, through valve 246 to the clutch cylinder 10.

The port C of the switching valve 241 is connected by a line 248 to the port B of a clutch re-engagement valve 249, whose port A is closed at 251, whose port C is open to the atmosphere and whose control port D is connected by a line 252 to one end of a check valve 253. The other end of the check valve 253 is connected by a line 254 to a line 256. The line 252 is also connected through a small time delay chamber 257 to the line 256. The chamber 257 is provided with a metering orifice at its inlet (lefthand, as appearing in the drawings) end and the check valve 253 is sensed (as indicated by the pin 253*a* limiting rightward movement of the check valve ball) to permit flow from line 254 to line 252 but to block opposite flow. Thus, line 252 will fill quickly through valve 253 from line 254 and 256 when line 256 is pressurized but will empty more slowly through said orifice into line 256 when line 256 is depressurized.

*Countershaft brake control portion*

The countershaft brake control portion 153 consists of a valve 258 whose control port D is connected by a line 259 to the line 234 at a point between the exhaust valve 231 and the time delay chamber 176. The port A of valve 258 is connected to one end of line 263 and port B is open to the atmosphere. Port C is non-functioning and hence may be omitted, plugged or left open as desired. The other end of line 263 connects to port E of an upshift valve 266 corresponding to the opening E of the valve of Figure 3. The port C of valve 266 is open to the atmosphere, the port A is connected by a line 267 to the line 192 and the port B of said valve is connected by a line 268 to the port A of a valve 269. The port C of countershaft brake valve 269 is open to the atmosphere, the port B is connected by a line 271 to the countershaft brake operating cylinder 48 and the control port D is connected by a line 272 to the line 180. The line 271 is also connected to the line 256.

A safety valve "S" may be provided, if desired, to protect the system from admission of pressure fluid at less than a predetermined minimum operating pressure.

OPERATION

In considering the operation of the apparatus described, consideration will first be given to its "at rest" condition in a neutral position, after which sufficient sample shift operations will be traced to make clear the operation of the apparatus.

Therefore, turning first to the "at rest" position of the apparatus shown in Figure 4, it will be assumed that the transmission mechanism is mounted in an automotive vehicle, such as a highway truck or an earth moving vehicle, that the system has been standing in a depressurized condition and that the vehicle compressor has just been started. This raises the pressure in the source 74 to a desired minimum, such as 50 to 60 p.s.i., the safety valve S opens and the system is ready to start.

In this condition, the manual selector 78 will be in the passageway 87, that is, in neutral position, so that the distributor 96 will be in connection with the line 97 and the line 98 is open to the atmosphere. As shown in Figure 4, the manual selector 78 is in alignment with first gear position slot 80 although this may be considered to be accidental since it does not have any bearing on the operation of the apparatus in its neutral position. The power rod 57 is in neutral position and, accordingly, the lever 142 is in an upward position actuating the valve 181.

In this condition, the source 74 supplies pressure fluid through the line 192 and the conduit 94 to the manifold 93. It also supplies pressure fluid through the line 161 to the port A of the valve 246 and through the line 243 to the port A of the valve 241. However, there being no pressure on the control ports D of valves 246 and 241, said valves are closed and both the line 15 and the clutch cylinder 10 are depressurized. With the clutch cylinder depressurized, the clutch will be engaged and, hence, rotation of the engine will effect corresponding rotation of the transmission countershaft. The source 74 further supplies pressure fluid through the lines 192 and 267 to the port A of the valve 266 in the countershaft brake control selection. Since the distributor 96 is connected to the line 97, pressure fluid is supplied to the line 97 and thence to the control port D of the valve 193 to hold same in position where ports A and B thereof are in communication.

In addition, pressure fluid is supplied from the line 192 through the line 191 to port A of valve 193 and also through line 191 to line 211 and thence to the port A of the valve 194. Pressure fluid also is supplied through the lines 211 and 62 to the lefthand chamber **58*a* of the cylinder 58 and through the line 209 to the port A of the valve 208. Since pressure fluid is supplied to the control port D of the valve 193, a connection is established from the port A to the port B thereof and, accordingly, pressure fluid is supplied from line 191 to the line 198, thence through the valve chamber 201 to the line 203, thence through line 59 to the righthand chamber 58*b* of the cylinder 58. This pressurizing of chamber 58*b* acts to push the piston 50 against the stop 58*c* and the pressure in the chamber 58*a* acts against the piston 55 to urge the rod 57 rightwardly until the extension 57*a* abuts against the piston 50, as shown in Figure 4. This urges the power rod 57 toward its center position and similarly urges the shift rod to which the finger 56** is at the moment connected.

Simultaneously, pressure from line 203 passes through line 218 to the port B of pulse valve 217 where a quantity thereof will pass from port B to port C (port D being depressurized) and thence into and through line 222 to the ports D of valves 204 and 241. Pressurizing port D of valve 204 effects connection between ports A and B thereof and blocks port C. Pressurizing port D of switching valve 241 connects ports A and B thereof by which pressure fluid reaches port D of clutch valve 246, pressurizing it and thereby admitting pressure fluid from line 161 to line 15, disengaging the clutch. This, if the parts are not already in neutral, will permit them to move into neutral.

In the meanwhile, a small quantity of pressure fluid passes through the bleed passageway 224 to the control port D of said valve and thence to the line 216. This, after a desired period of time, usually a small fraction of a second, pressurizes line 216 and connects the port B to the port A of valve 217 which, however, is plugged, hence, the line 218 is then in effect closed at the valve 217 but the bleed hole 224 will continue to supply pressure to line 216. However, since the control port D of the valve 213 is depressurized, nothing further happens at this point. Terminating the supply to line 222 has no effect since sufficient pressure is then trapped in lines 222 and 223 to hold pressure on ports D of valves 204 and 241.

With pressure held on port D of switching valve 241 as above described and pressure therefore also in line 244, pressure will pass through valve 181 into line 180 and thence into line 179 to pressurize ports D of valves 163 and 269. There being no supply at port A of countershaft brake valve 269, nothing further will happen here. At valve 163 connection will be established between ports A and B and line 164 will become pressurized to pressurize in turn ports D of valves 231 and 258. There being no supply to valve 258, nothing further will happen here. At exhaust valve 231, connection will be established between ports A and B and lines 222 and 223 will be exhausted, thus depressurizing ports D of valves 204 and 241, check valve ball 202 now moving upwardly to prevent escape of fluid from line 203. Thus, with valve 193 open, pressure is held on chamber **58*b* to cooperate with pressure in chamber 58*a* to maintain the neutral position of the parts. However, the presence of the timing chambers 178 and 176 will insure pressure being held on port D of valve 231 long enough to insure full depressurizing of lines 222 and 223 even if, as hereinafter described, line 244** and those lines connected thereto, are simultaneously exhausted.

Depressurizing port D of valve 241 will connect line 244 through valve 241 to line 248 and thence to port B of valve 249.

Assuming that the button 132 has not been previously depressed, as will be discussed in more detail hereinafter in connection with upshift sequences, then no pressure fluid will be applied to port D of clutch re-engagement valve 249, resulting in exhausting of pressure fluid from line 248 through valve 249 to atmosphere. This closes valve 246 and re-engages the clutch, and is the condition shown in Figure 4.

Since movement of the selector device 78 into any position in the passageway 87 will not change the position of the distributor 96, the lever may be moved freely into any portion of the slot 87 without changing the neutral condition as above described.

Depressurizing of valve 241, mentioned above, and the consequent depressurizing of line 244, will also depressurize lines 180, 272, 179 and 177, thus depressurizing control port D of selector supply valve 163 and closing same to depressurize the selector system 151. The portion of the action just described, commencing with the pressurizing of line 222 from any source and ending with the exhausting of line 222 through valve 231 will be observed hereinafter to occur at the beginning of every shifting movement from a shifted position toward neutral or toward another shifted position as well as at the beginning of every movement toward a shifted position after a pause in neutral. For convenience in reference, this will sometimes hereinafter be referred to as the "neutral cycle."

Thus the system reaches and maintains a stable "at rest" position with the parts and pressure distribution arranged as shown in Figure 4.

*Neutral to first*

Assume now that it is desired to start the vehicle from a standstill and under conditions where the driver wishes to shift the transmission into its lowest, or first, forward speed. The following description will, for illustrative purposes, proceed on the basis of a fully automatic operation and such is entirely within the capacity of the equipment. However, in many instances a pedal operation of the clutch will be preferred when starting from a standstill and such can be readily carried out.

Turning now to the automatic operation and assuming that the operator will correctly time the depressing of the accelerator pedal with the reengagement of the clutch after the parts have completed their shift into first gear position, the cap 132 of upshift valve 266 will first be depressed in order, as will become apparent in detail later, to direct the sequence which follows so as to hold the clutch disengaged until after completion of the shift and to actuate the countershaft brake. The selector lever 78 will then be aligned with the first speed slot 80 (Figure 4) and moved into slot 80 to occupy the position shown in Figure 5.

Manual depressing of the cap 132 will open the upshift valve 266 and pressure fluid will pass from the pressurized line 267 to the line 268 but, inasmuch as the control port D of the countershaft brake valve 269 is not yet pressurized, the pressure fluid in the line 268 will not yet pass the valve 269. For reasons above described, the valve 266 when once opened will stay open until its upper chamber 131 is depressurized through line 263 and valve 258.

As soon as the lever 78 is aligned with the slot 80, the distributor 103 will be brought into registry with the line 104, as shown in Figure 5. This supplies pressure fluid from source 74, through the conduit 102 to the manifold 101, through the distributor 103, and thence into the line 104 and the line 186 to the control port D of the valve 173 in the selector portion 151 of the control mechanism. This establishes a connection from the port A of valve 173 to the port B thereof but inasmuch as the line 166 is not yet pressurized, nothing further will happen.

Now when the selector device 78 is moved into the first or low gear slot 80, no further movement of the distributor 103 will occur, but distributor 96 is now caused to move out of alignment with both the lines 97 and 98 whereby both said lines become depressurized. By thus removing the pressure from the line 196, the connection between the port A and port B of the valve 193 is blocked and a connection is established (Figure 5) from the port B to the port C of said valve. This results in pressure within the chamber 58*b* passing through the line 203, through the valve 193 into the line connected to the port C thereof on into the line 222 to start a neutral cycle. The check valve 201 prevents the direct passage of pressure fluid from line 203 to line 199, but since pressure backs up from line 222 into line 199, the check valve 201 is in this instance actually nonfunctional.

Pressure then goes from the line 222 to the port A of the valve 231, to the port C of the pulse valve 217 and into the line 223. Pressure in the line 223 goes to the control ports D of the valves 241 and 204 and repressurizes said valves. Since there is no pressure at the port C of the valve 204, nothing further happens at this point. However, pressure from the line 243 at the port A of the switching valve 241 upon the opening of said last-named valve passes into the line 244 and to the control port D of the valve 246 and opens same. This permits pressure fluid to flow from the pressure supply line 161 through the valve 246 to the clutch control cylinder 10 and results in again disengaging the vehicle clutch assuming that the driver has not already disengaged the clutch by depressing pedal 13. Pressure also flows from the line 244 into the line 182 and thence to the valve 181. Inasmuch as the valve actuator 143 is holding the valve 181 open, due to the power rod 57 being in its neutral position, pressure fluid will pass through said valve 181, through line 180 to the line 179, thence to the entrance of the chamber 178.

Pressure also flows from line 180, through line 272, to the control port D of the valve 269 in the countershaft brake control portions. Pressure at said last-named control port D will open the valve 269 so that pressure in the line 268 will pass through said valve to the cylinder 48 of the countershaft brake for actuating same.

Pressure in the line 271 will also pass into the line 256 and through both the time delay chamber 257 and the check valve 253 to pressurize the line 252. This will pressurize the control port D of the valve 249. Inasmuch as the line 248 connected therewith is at this point depressurized, nothing further will happen here.

Turning now to Figure 6 for the next stage in the operation of the apparatus, it will be seen that the time delay chamber 178 is now filled and the pressure has passed through the line 177 to the control port D of the valve 163. The purpose of the delay provided by the filling of the chamber 178 will become apparent in connection with the description of subsequent shifts from one moving position to another moving position. Pressurizing of the control port D of the valve 163 opens said valve and permits pressure fluid from the line 161 to pass into the line 164 and thence into the line 166. This pressurizes the line 69 and thereby the lower chamber 68*a* of the selector cylinder 68, and this, if not opposed, would push the lowermost piston 60 therein up against the stop 75. However, pressure in the line 166 will also pass through the line 172 to the port A of the valve 173.

Inasmuch as the line 186 is pressurized as above described and the valve 173 thereby opened, pressure will pass through said valve to the line 65 and into the chamber 68*d* of the selector cylinder 68. This pushes the piston 60*b* against the stop 75*a*, moves the piston 60 to the position shown in Figure 6 and causes the finger 56 of the selector mechanism to engage the yoke 52 of the shift rod 4.

Turning now to Figures 6*a* and 6*b* for the next stages in the operation of the apparatus, the pressure fluid in the line 164 will fill the chamber 176 and then pass into the line 234 and into the line 259. This pressurizes the port D of the valve 258 and opens same and also pressurizes the control port D of the valve 231 and opens same. Opening of the valve 258 exhausts the holding pressure within the interior of the valve 266 and permits said valve 266 to return to its normally closed position which terminates communication from the line 267 to line 268 and instead connects line 268 to the port C of valve 266 (Figure 6*a*) and exhausts same. The line 268 being connected to the line 271 through the valve 269, the depressurizing of the line 268 depressurizes the line 271 and thereby depressurizes both the line 256 and the cylinder 48 operating the countershaft brake. The countershaft brake is thereby released and the supply of pressure fluid to the control port D of the valve 249 is terminated. However, there being a supply of pressure fluid in the chamber 257, and the check valve 253 permitting no flow in a leftward direction from the line 252, pressure fluid is momentarily held on the port D of valve 249 for purposes appearing immediately following.

At the same time (Figure 6*a*) the pressurizing of the control port D of the exhaust valve 231 connects the line 232 to the open line 233 of valve 231 which depressurizes line 232, line 222 and line 223 to complete the neutral cycle. Since in this instance ports D of both valves 193 and 194 are depressurized, the line 203 can discharge to line 222 and thence through valve 231 by way of either of valves 193 and 194 and hence the position of the check valve 201 is at this point immaterial. Depressurizing of the line 223 will depressurize the line 242 and thereby connect the port B of the valve 241 to the port C thereof. This connects the line 244 with the line 248 through the valve 241. Inasmuch as pressure is still present in the line 252, the connection in the valve 249 is as shown in Figure 6*a*, namely, from the port B to the plugged port A and the exhaust of line 248 is prevented. Thus, pressure remains trapped in the lines 248 and 244 and hence on the control port D of the clutch valve 246. This, then, for so long as the control port D of valve 249 is pressurized, holds the clutch valve 246 open and pressure remains applied through the line 247 to the clutch cylinder and the clutch remains disengaged.

Since lines 196 and 197 are already open to the atmosphere and the ports C of the valves 193 and 194 are already open to the ports B thereof, depressurizing of the line 222 will also depressurize the line 203 through the valves 193 and 194 (Figure 6*b*). This in turn will depressurize the line 59 and thereby depressurize the rightward chamber **58*b* of the cylinder 58. Lines 221, 218 and 216 are also depressurized at this point but this has no effect upon this step of the operation of the apparatus. Depressurizing of the rightward chamber 58*b* of the cylinder 58, bearing in mind that the leftward chamber 58*a* is constantly pressurized through the line 62 and lines connected thereto from the source 74 as above described, initiates a rightward movement of the rod 57 and thereby moves the shift rod 4** rightwardly into first gear position.

As the rod 57 moves rightwardly, the cam 141 releases the lever 142 which drops against the pin 144 and the valve actuator 143 is moved within the valve 181 by the spring (Figure 3). This closes the valve 181 as shown in Figure 6*b* which connects the line 180 thereof with the port C and this results in depressurizing the line 180 and thereby depressurizing of the lines 179 and 272. Depressurizing of the line 272 depressurizes the control port D of the valve 269 and this then connects the port B thereof with the port C which continues the depressurizing of the lines 271, the countershaft brake cylinder 48 connected therewith and the line 256, as above described.

The presence of the time delay chamber 257 insures that the clutch is held disengaged for a period of time, although said period is measured in a small fraction of a second, after the commencement of rightward movement by the shift rod 57. This insures engagement of the gears in their first gear position before re-engagement of the clutch.

As the supply of fluid pressure in the chamber 257 becomes exhausted, the pressure in line 252 dissipates and the control port D of the clutch re-engagement valve 249 is depressurized. Depressurizing of the control port D of valve 249 reconnects the line 248 to the atmosphere through the port C of valve 249, and, since the control port D of the valve 241 has already been depressurized, the line 244 will be connected by line 248 to the port C of the valve 249. This depressurizes the control port D of the valve 246 and connects the line 15 to atmosphere through the port C of the valve 246. Thus, the cylinder 10 of the clutch is depressurized, the clutch is re-engaged (Figure 7), and the shift is completed.

Alternatively, if the driver is holding the clutch pedal 13 depressed, the parts will go through their cycle as above described up through the connection of ports B and C of clutch valve 246, as mentioned in the last preceding paragraph. The clutch may then be engaged at the desire of the driver by releasing the pedal 293 and permitting escape of pressure fluid from the clutch cylinder 10 through ports C of valves 246 and 291.

*First to second*

Shifting from first to second follows essentially the same sequence as shifting from standstill to first but with certain differences which will appear in the discussion hereinafter following.

Referring to Figure 8, the cap 132 of the upshift valve 266 will first be manually depressed. Upon the depression of the cap 132, and consequent admission of pressure fluid to the port B of upshift valve 266, pressure fluid will pass through the passageway 125 in the stem of said valve into the upper chamber 131 thereof and hold said stem in downward position. Upon such manual depression, valve 266 will remain in open position until the release of said pressure from said upper chamber. Following this, when desired, the manual selector 78 is normally moved directly from the recess 80 into the second speed recess 82 by the operator and it may be so moved as rapidly as the operator wishes or is able to effect such movement. This movement will initiate suitably action by the transmission control apparatus and the shift will be effected solely under the influence and timing of the shift control mechanism. Thus, while the operator has full control over and selection of the gear ratio into which a shift is to be made and the instant of initiation of any shift when he has selected the time and nature of the shift to be made by moving the selector 78, he has neither further responsibility nor control thereover.

In the meantime, inasmuch as the shift selector has not rotated about the axis Y, the distributor 103 has not moved from the position occupied in connection with the first gear position, and, accordingly, line 104 remains pressurized and the finger 56 still remains in connection with the shift rod 4. With the manual selector 78 now continuing to move rapidly toward second gear position and attaining the position shown in Figure 8, this connects the distributor 96 to the line 98 and connects the line 97 to the atmosphere. Thus, if line 97 picked up any pressure fluid when distributor 96 passed line 97 (which it usually will not) such opening to the atmosphere insures exhausting thereof. With line 97 remaining (or becoming) depressurized the control port D of the valve 193 is depressurized and connects the line 198 to the port C of said valve. Pressurizing of line 98 pressurizes the control port D of valve 194 and opens same to thereby connect the ports A and B for pressurizing line 199, and simultaneously pressurizes port D of valve 213. Pressure in line 203 passes through line 218 to pulse valve 217, thence (since port D thereof is depressurized) out through port C to line 222 to start the neutral cycle. This pressure enters line 223 and thereby pressurizes the control port D of the valve 204 and also pressurizes control port D of switching valve 241 to open same which permits pressure fluid to pass from the line 243 through said valve 241 into the line 244 where it pressurizes the control port D of the clutch valve 246. This permits pressure fluid to pass from the line 161 to the line 15 and thence to the clutch cylinder 10 for disengaging the clutch. Simultaneously, pressure fluid passes through the opening 224 into line 216 from which it passes through valve 213 (port D thereof having been previously pressurized) to port D of valve 208, at which point it stops. Thus, pressure will build up in line 216 during a controllable period of time (sufficient for port D of valve 204 to become pressurized before any pressure comes on port C of valve 204) until it pressurizes ports D in both of valves 217 and 208. Pressurizing port D in pulse valve 217 terminates flow from port B to port C thereof and terminates the supply of pressure in line 222. However no escape being available for the pressure in lines 222 and 223, pressure is trapped therein and the clutch remains disengaged (the desired slowing of the transmission input shaft, which is often brought about by double-clutching, being here brought about by engagement of the countershaft brake as hereinafter described).

In the meantime, pressure fluid passing through valve 194 and line 203 pressurizes line 59 and thereby chamber 58*b* for uring the piston 50 leftwardly against stop 58*c* and thereby, since the effective area of the rightward side of piston 50 is greater than the effective area of the leftward side of piston 55, urging the power rod 57 toward neutral. Pressure from the line 223 having already been applied to the control port D of the valve 204, this connects the central chamber 58*d* of the shift cylinder 58 through the port A of the valve 204 to the atmosphere. This releases any pressure fluid from within the said central chamber 58*d* and facilitates centering of the power rod 57, as above described. The stop 58*c* limits leftward movement of piston 50 so that pressure in chamber 58*b* pushes the power rod 57 no further leftward than its neutral position.

Admission of pressure fluid to the line 244, above mentioned, also effects entry of pressure fluid into the line 182 to pressurize the port A of the valve 181 and, upon opening said valve by actuating of the lever 142, as above described, when the power rod 57 is in its neutral position, said pressure fluid will pass therethrough into the line 180 and thence through the line 179 to the delay chamber 178 and similarly through the line 272 to the control port D of the valve 269 in the countershaft brake control.

Recalling now that the cap 132 of the valve 266 has been previously depressed, said valve is open and passing pressure fluid from the pressure line 267 into the line 268 to the countershaft brake valve 269. Thus, when the control port D of valve 269 becomes pressurized, pressure will pass therethrough to line 271 and thence to the countershaft brake cylinder 48 for applying the countershaft brake.

Pressure fluid also passes from line 271 to the line 256 and thence through the check valve 253 for immediately charging the chamber 257 (from the rightward end) and for pressurizing port D of valve 249.

Immediately thereafter as pressure fills the delay chamber 178 (said chamber providing assurance that the transmission returns to neutral position and that any rebounding has subsided before any energizing of the selector portion 151 occurs), it will be supplied through the line 177 to the control port D of the valve 163 which upon opening will permit pressure fluid to flow from the line 161 through the line 166 to the valve 173 and to chamber 68*a*. Since pressure has already been applied to the control port D of said valve 173, pressure fluid will then flow through the line 65 into the upper chamber 68*d* of the shift rod selector cylinder 68. As before, pressure has already been applied through the line 69 into the lower chamber of said cylinder. This being the same pressure relationship as was applied to the cylinder 68 in its previous position in first gear, no change in its position will occur and the finger 56 will remain connected with the shift rod 4 as previously.

While the last above-described operations have been occurring, pressure fluid from the line 203 has passed through the opening 224 in the stem of the pulse valve 217 and thence into the line 216. With pressure already applied from lines 98, 197 and 214 to the control port D of the valve 213, pressure in line 216 will pass to the control port D of the valve 208 to open same and, thus, permit pressure fluid which is already in the line 209 to pass to the line 207.

In the meantime, pressure from the line 164 has reached the delay chamber 176, delayed slightly while said chamber was being filled and thereby providing for a pause of the transmission in neutral position to give the counter shaft brake time to act. Thus, the driver does not determine, nor has he any control over, the time the apparatus remains in neutral.

Now, considering the movement out of neutral and into second gear, it will be seen that as chamber 176 is filled the lines 234 and 259 become pressurized (Figure 9). The pressurizing of the line 234 and the line 259 pressurizes the control port D of the valves 231 and 258, respectively, and opens same and completes the neutral cycle portion of the shift sequence.

Pressurizing of the control port D of valve 258 opens the line 263 through said valve to the atmosphere and depressurizes the upper chamber 131 of the valve 266. Depressurizing of the upper chamber of the valve 266 opens the port B of said valve to the atmosphere and results in depressurizing the line 268. Thus, it will be apparent that the time during which the countershaft brake remains engaged and the transmission parts remain in neutral will be determined by the sum of the periods of time required to fill the time delay chambers 178 and 176. With the depressurizing of the line 268, the line 271 exhausts through the valves 269 and 266 and the countershaft brake is released.

Depressurizing of the line 271 will also depressurize the line 256, but in view of the chamber 257 which will for a brief moment supply pressure to the line 252, said line 252 will remain pressurized. Thus, the clutch will not re-engage until after the shift has been completed.

Pressurizing of the control port D of the exhaust valve 231 will open the lines 222 and 223 to the atmosphere and thereby depressurize the valves 204 and 241. This restores the connection from the line 207 to the line 61 and supplies pressure fluid to the central chamber 58*d* of the shift cylinder 58. In the meanwhile, the supply to lines 98 and 197 has held valve 194 open to its port B and thereby held lines 199 and 203 pressurized, thereby holding chamber 58*b* pressurized. Depressurizing of the line 222 as above mentioned while maintaining line 203 pressurized is permitted by the check valve 201 wherein the ball under the conditions now being considered will move into its lower position for blocking communication between line 203 and line 198. By thus holding pressure in chamber 58*b* there is provided a backing force holding the piston 50 against rightward movement. Thus, the pressure in the central chamber 58*d*, being imposed upon a greater area than the pressure within the leftward chamber 58*a*, will urge the piston 55 leftwardly and effect a shift of the shift rod 4 to which the finger 56 is at the moment connected toward its desired shifted position, here taken to be the second gear position.

When the power rod 57 moves out of neutral position and into second gear (Figure 10), the lever 142 ceases to actuate the valve 181 and pressure fluid is thereby cut off from the line 180. This depressurizes the control port D of the countershaft brake valve 269 and thereby connects the line 271 to the exhaust. This continues the depressurizing of the countershaft brake cylinder 48 and furthers the disengagement of the countershaft brake.

The line 180 and the line 179 connected thereto and the chamber 178 exhaust to the atmosphere through the port C of the valve 181. Chamber 176, line 259 and line 166 all exhaust through the port C of the valve 163.

In the meanwhile, delay chamber 257 completes exhausting into depressurized line 256 and thus exhausts line 252 and depressurizes control port D of valve 249. This exhausts line 248 through port C of valve 249 and exhausts line 244 through ports B and C of switching valve 241. This depressurizes port D of clutch valve 246, thereby closing said valve, depressurizing the clutch cylinder 10 and re-engaging the clutch.

It will be seen that for as long as the shift selector 78 remains in the slot 82 corresponding to second gear position the pressure fluid remains under pressure in lines 98 and 197, hence through valve 194 and line 203 to chamber 58*b*, and pressure also remains in lines 214, 216, 212, 207 and 61 and holds pressure on chamber 58*d*. Main lines 161, 191 and 192, of course, remain pressurized at all times. All of the other parts, however, have become depressurized as indicated in Figure 10 and the shift is completed.

*Second to third*

The shift from second to third will involve substantially the same sequence of steps as the above-described shift from first to second and does not need to be repeated in detail.

It is sufficient to point out that here the distributor 103 will be moved from its connection with the line 104 to a connection with the line 105, and, accordingly, the control port D of the valve 171 will be pressurized in place of the control port D of the valve 173. This will, upon opening of the valve 163 during the neutral cycle as above described, pressurize the line 71 which will first move piston 60*b* upwardly and then impel the piston 60*a* against the stop 75 and thereby cause the finger 56 to engage the shift yoke 53 of the shift rod 3. The piston 60*a* will be moved against the pressure in chamber 68*a* since the pressure in chamber 68*c* will act on the entire upper surface of piston 60*a*.

The sequence of events with respect to the remainder of the shifting steps is the same as above described in connection with the shift from first to second and can be understood from the following summary taken with the detailed description above.

Since the selector lever 78 will be leftwardly in slot 85, line 98 will be depressurized and thus depressurizing ports D of valves 193, 194 and 213, the depressurizing of which latter valve results in also depressurizing port D of valve 208. This exhausts chamber 58*d* through valve 208 so that upon disengagement of the clutch the rod 57 moves rightwardly toward neutral position. Chamber 58*b* and line 203, having previously (in the second gear position of the transmission) been pressurized, now can supply a limited, but sufficient, amount of pressure fluid through valve 194 to fill lines 222 and 223 to start a neutral cycle. With valve 231 being closed, this pressure fluid is trapped and pressure remains in chamber 58*b*. This holds piston 59 against stops 58*c* and thereby stops the rightward movement of rod 57 at its neutral position and holds it in such position until the timing out of the neutral cycle. Upon the timing out of the pause in neutral position and the resulting discharging of chamber 58*b* and lines 203, 222 and 223 through valve 231, pressure in chamber 58*a* will cause further rightward movement of rod 57 together with eventual re-engagement of the clutch. This, together with the above-mentioned engagement of rod 3 by finger 56, effects a shift into third gear.

*Third to fourth*

The shift from third to fourth will follow the same steps as above described in connection with the shift from first to second excepting that here the distributor 103 will remain in connection with the line 105 so that the finger 56 will continue in constant connection with the shift rod 3. Leftward movement of the rod 57 follows from the rightward position of the selector lever 78 for the same reasons as above described in connection with the shift into second gear.

*Fourth to fifth*

Here the distributor 103 will not be connected with any of the lines 104, 105 and 106 and, thus, opening of valve 163 as above described will pressurize only the line 69 and thereby pressurize only the chamber 68*a* in the selector cylinder 68. This will drive the rod selector mechanism to its full upward position as appearing in the drawings and connect the selector finger 56 with the shift rod 5.

The remainder of the steps involving the power rod 57, actuating the countershaft brake cylinder 58 and the clutch cylinder 10 will all proceed as above described in connection with the shift from first to second. Again, leftward movement of the rod 57 will occur upon discharging of lines 222 and 223 through valve 231 for the same reasons as above described in connection with the shift into second gear.

*Downshift*

The downshifting sequence is the same as above described for upshift shifting except that in this instance the driver will not actuate the cap 132 prior to such shifting. The valve 266 thus remains closed throughout the shift sequence and there is no pressure supply for the valve 269 even after its control port D becomes pressurized shortly after the rod 57 enters into neutral position. Thus, the countershaft brake cylinder 48 is not energized during the downshift sequence but instead the operator will depress the accelerator to accelerate the engine an amount suitable for the downshifting sequence being effected.

Further, by not depressing the button 132, and therefore not pressurizing line 271 when the parts are in neutral position, there is no pressurizing of the lines 256 and 252, hence no pressurizing of port D of valve 249. Thus, immediately upon the pressurizing of port D of exhaust valve 231 (which as above described occurs a period of time after the entry into neutral determined by the delay chambers 178 and 176), and consequent depressurizing of lines 222 and 223 and depressurizing of control port D of switching valve 241, line 244 will exhaust at once through ports C of valves 241 and 249. This re-engages the clutch immediately after the pause in neutral position (timing out of delay chambers 178 and 176) instead of, as in the case of an upshift, after the timing out of these same delay chambers plus the timing out of the delay chamber 257. Thus, in a downshift, the clutch re-engages at the end of the neutral cycle, namely, near the end of the pause in neutral and remains engaged during the remainder of the shift sequence thereby, with the throttle being held open, causing the engine to effect synchronization of the shiftable parts.

*Reverse*

A shifting movement into reverse gear is, of course, accomplished from a neutral position with the vehicle at a standstill.

As in the case of the shift into first gear from neutral at a standstill, the shift will be started by depressing the button 132 to obtain countershaft braking action. The clutch will usually be released by depressing the clutch pedal 13, but the automatic operation of the clutch can be utilized if the driver properly times his actuation of the accelerator.

The shift selector 78 is then moved from the neutral passageway 87 into alignment with the reverse slot 84 which rotates the manifold 101 about the "Y" axis. This will move the distributor 103 into alignment with the line 106 so that the control port of valve 168 is pressurized. When the line 166 and line 70 are pressurized upon opening of the valve 163, chamber 68*b* will be pressurized and the finger 56 will be moved the full distance downwardly and it will be connected with the shift yoke 54 associated with the shift rod 2.

Upon movement of the shift selector 78 into the reverse slot 84, the distributor 96 is caused to rotate into alignment with the line 98 and thereby initiate actuation of the shift mechanism in the manner above described in detail in connection with a shift into second gear.

In all other respects, the shift into reverse gear will follow the sequence of actions above described and can be readily traced in the same manner as above set forth.

Again, leftward movement of the rod 57 will occur upon discharging of lines 222 and 223 through exhaust valve 231 for the same reasons as above described in connection with the shift into second gear.

Thus, there is provided an all fluid pressure, as air, controlled shift in which the selecting of the shifting ratios is completely within the control of the driver and it is possible for the operator to move the selecting lever freely from one shift position to another shift position, either in an upshift or a downshift direction, skipping ratios if desired, and without waiting for the shift mechanism to follow the movement of said lever before completing the movement of said lever from, for example, neutral position into a shifted position. On the other hand, the shift itself is carried out in a fully automatic manner upon the selection provided by the operator. Further, this shift is carried out at an extremely fast rate so that the driving and driven shafts of the transmission are disconnected for only a very short period of time. In the usual embodiment of the invention such time is normally only a small fraction of a second. Thus, the transmission is of particular applicability to low-speed, high-load applications, such as earth-moving apparatus and other vehicles operating under very high-load conditions.

While the foregoing description has assumed throughout that the shift selector 78 will be moved as rapidly as possible from one shifted position to another, and the ability to make such movement rapidly is one of the major objects of the invention, it is entirely possible for the equipment to operate successfully when the shift lever is moved slowly or even permitted to pause in neutral position. In such case, referring to Figure 11, this will connect the distributor 96 to the conduit 97 and this pressurizes the control port D of the valve 193 to thereby open same. This permits pressure fluid to enter from the line 191, pass through the valve 193 to the conduit 198, and thence by way of the conduit 203 to the righthand side **58*b* of the shift cylinder 58. Where the transmission has previously been in its first or third position, so that the shift rod 57 was previously in its right-hand position, this urges the shift rod 57 leftwardly toward neutral position to the extent permitted by the stops 58*c*. Simultaneously, since line 216 was previously depressurized with the depressurizing of line 203, the port B of pulse valve 217 is connected to port C thereof and admission of pressure fluid into line 203 will supply pressure fluid to line 222 until the line 216 becomes pressurized and the valve 217 shifts. The rate of pressure build-up in line 216 is sufficiently slow that it will not shift the valve 217 immediately and hence sufficient time will be allowed before valve 217 shifts for a full charge of air to enter lines 222 and 223 to start a neutral cycle. When pressure builds up in line 216, the valve 217 will close and the system will go through its cycle in the same manner as above described, including a disengagement of the clutch resulting from the pressurizing of control port D of valve 241, thereby permitting the parts to respond to the pressure in chamber 58*b* and move into neutral position. Subsequently, as pressure passes through the lines 182, 180, 179, 177, 164 and 234 to pressurize the valve 231, the line 222 will be exhausted and the neutral cycle ended (Figure 4) with the result that the valve 241 will again be connected through its ports B and C and the clutch will re-engage in the manner also above described. Here, however, since (1) pressure is being held continuously on the control port D of the valve 193 and hence in the line 203 and chamber 58*b*, (2) pressure is constantly being supplied through line 62 to chamber 58*a*, and (3) no pressure enters through the line 61 into the chamber 58*d*, the parts will remain in neutral position for so long as selector 78** remains in neutral position.

Assuming now that the selector 78 is moving into its neutral position from any of its second, fourth, fifth or reverse positions, so that the shift rod 57 was previously in its left-hand position, the opening of the line 98 to the atmosphere will depressurize control port D of valve 194 and similarly depressurize the control port D of valve 213. Depressurizing of control port D of valve 194 will remove the connection from ports A and B thereof and remove the supply from line 191 to line 199 but the connection of line 196 to control port D of valve 193 will connect the supply from line 191 to line 198 and thus the line 203 and the chamber **58*b* will remain pressurized. Removal of pressure from control port D of valve 213 will open line 212 through valve 213 to the atmosphere and thereby connect chamber 58*d* through valves 204 and 208 to port C of valve 208 and thence to the atmosphere, thus depressurizing chamber 58*d* while leaving chambers 58*a* and 58*b* pressurized. Line 222 was previously depressurized but with the valve 231 having closed at the end of the previous cycle, line 222 now represents a trapped system which takes only a small amount of air to fill it and start a neutral cycle. Line 199 having been previously pressurized, this provides sufficient back pressure on the check valve 201 that the ball 202 does not respond to whatever differential in pressure may exist between line 203 and line 222 to close the upper end of the valve 201 when a connection occurs from line 199 through valve 194 to the line 222. Thus, with the depressurizing of port D of valve 194, air is admitted from line 203 through valve 194 to line 222 and the port D of valve 241 becomes pressurized. Pressure fluid is thereby admitted into line 244 and thence to control port D of valve 246 and the clutch is disengaged. Pressure simultaneously flows through line 182 to follow the circuit through delay chambers 178 and 176 and line 234 to valve 231 which then depressurizes line 222**, terminates the neutral cycle and permits the clutch to re-engage.

Here again, since pressure is being held on control port D of valve 193 and hence in line 203 and chamber **58*b*, but none is supplied to line 61 and chamber 58*d*, the shift rod will remain in neutral position so long as the selector 78** remains in neutral position.

When the shift lever 78 then moves from neutral to a shifted position, the distributor 96 depressurizes line 97 regardless of the direction of such movement and it pressurizes line 98 if the shift lever 78 has moved rightwardly into any of its second, fourth, fifth or reverse positions. By depressurizing line 97 and thereby depressurizing the control port of valve 193, valve 193 is exhausted and automatic operation resumes. Thus, another neutral cycle will commence and the clutch will be disengaged upon the appearance of a pulse in line 222 as above described, following which (*a*) if movement of selector 78 is toward any of its second, fourth, fifth or reverse positions so that lines 98, 197 and 214 are pressurized, then as above described both of chambers **58*b* and 58*d* will become pressurized and upon the timing out of the neutral cycle and opening of the valve 231 the shift rod 57** will be moved leftwardly, or (*b*) if the movement of the selector 78 is toward either its first or third position, then lines 98, 197 and 214 are depressurized and line 203 and chamber **58*b* are also depressurized as above described and upon timing out of the neutral cycle and opening of valve 231 the shift rod 57 responds to the pressure in chamber 58*a* and moves rightwardly. In all cases, the clutch is first disengaged and is subsequently re-engaged upon expiration of the neutral cycle, and the shift progresses automatically as above described according to the position in which the selector 78** is moved.

Thus, a pause in neutral of the selector 78 can be used to provide a double-clutching operation.

Further, the clutch pedal may be used at any time to override the automatic operation to the extent of disengaging the clutch when desired, but not to engage it if the automatic control directs it to be opened.

Although a particular preferred embodiment of the invention has been disclosed hereinabove for illustrative purposes, it will be understood that variations or modifications of such disclosure which do not depart from the scope of the appended claims are fully contemplated.

What is claimed is:

1. Control apparatus operable by fluid pressure for automatically effecting the shifting of a transmission driven by a power source, said transmission having a plurality of shift rods, a countershaft and a countershaft brake associated therewith, comprising in combination: shift effecting means responsive to application of fluid pressure thereto for moving a selected shift rod axially a predetermined direction and distance; shift rod selection means responsive to the application of fluid pressure thereto for connecting said shift effecting means to a selected shift rod; a first pressure fluid actuated system for controlling application of fluid pressure to said selection means; a second pressure fluid actuated system for controlling the energization and de-energization of said shift effecting means; manually operable selector means arranged to move in one direction to actuate said first system and further arranged for movement in another direction to actuate said second system, said last-named direction being at a substantial angle to said first-named direction, said second system including means for moving said shift effecting means to neutral position, for activating the countershaft brake while same is in neutral position during an upshift of the transmission and then for continuing movement of the shift effecting means into a shifted position.

2. The device defined in claim 1 including a neutral valve and means effecting opening of same upon attainment of neutral position by said shift effecting means, and connections including a time delay device for initiating operation of said shift rod selection means a predetermined time after opening of said neutral valve.

3. The device defined in claim 1 including a neutral valve and means effecting opening of said neutral valve upon attainment of neutral position by said shift effecting means; and fluid responsive means for energizing said countershaft brake upon opening of said neutral valve, said last-named means including also a time controlled device for de-energizing said countershaft brake a predetermined time following attainment of neutral position by said shift effecting means.

4. The device defined in claim 1 including a clutch between the transmission and the power source therefor, pressure responsive means for disengaging said clutch, and means supplying pressure thereto to disengage said clutch substantially simultaneously with the energizing of the shift effecting means for urging a shift rod from a shifted position toward neutral position.

5. The device defined in claim 4 including time responsive means for re-engaging said clutch a predetermined period of time following the entry of said transmission into its neutral position.

6. The device defined in claim 5 including time delay means associated with said clutch for maintaining said clutch disengaged for a predetermined time after said countershaft brake is released on an upshift.

7. Control apparatus operable by fluid pressure for automatically effecting shifting of a transmission having shift rods upon selection by an operator, comprising in combination: shift rod engaging means alternatively engageable with said shift rods; power operated means connected to said shift rod engaging means for moving same between neutral and shifted positions; cylinder means connected for operating said power operated means; conduits connected to said cylinder means for supplying fluid pressure thereto to effect shifting of said shift rod engaging means; fluid pressure operated selector means engageable with said shift rod engaging means for moving same from one shift rod to another; first valve means for controlling operation of said selector means; second valve means for controlling the supply of fluid pressure to said cylinder means, said second valve means including means operable upon selection of the next gear ratio by the operator to move the shift rods into neutral; a neutral valve operable when said shift rods are in neutral and means including a first time delay device connecting said neutral valve to said first valve means for actuating said selector means to move said shift rod engaging means into engagement with a selected shift rod a predetermined time after the shift rods reach neutral; means including a second time delay device connecting said first valve means to said second valve means for supplying fluid pressure thereto for completing the shift of the selected shift rod whereby shifting of the transmission is completed a predetermined time after selection of the shift rod to be shifted.

8. Control apparatus according to claim 7 wherein the transmission has a countershaft, a fluid pressure operated countershaft brake; an engine and a fluid pressure operated clutch connected between the engine and the transmission; manually preselectable countershaft brake valve means and means connecting said countershaft brake valve means to said neutral valve for applying said countershaft brake during an upshift of the transmission when a shifted shift rod reaches neutral position; clutch valve means and means connected to said clutch valve means for disengaging said clutch as said shifted shift rod is urged toward neutral; means including third time delay means connecting said clutch valve means to said countershaft brake valve means for reengaging said clutch a predetermined time after said countershaft brake is released.

9. Control apparatus operable by fluid pressure for automatically effecting shifting of the shift rods of a transmission upon selection by an operator, comprising in combination: shift effecting means responsive to application of fluid pressure thereto for moving a selected shift rod between shifted and neutral positions; shift rod selection means responsive to application of fluid pressure thereto for connecting said shift effecting means to a selected shift rod, said shift rod selection means including a fluid pressure operated main valve and a plurality of fluid pressure operated subsidiary valves operable by fluid pressure from said main valve, each of said subsidiary valves being connected for controlling supply of fluid pressure to said selection means in order to move said shift effecting means into connection with one of said shift rods at a time; a neutral valve operable when the shift rods are in neutral for supplying fluid pressure to said subsidiary valves; and manually operable selector means for selectively opening one of said subsidiary valves at a time whereby said shift rod selection means is moved into engagement with a selected shift rod after all of said shift rods are in neutral.

10. Control apparatus operable by fluid pressure for automatically effecting shifting of the shift rods of a transmission upon selection by an operator, comprising in combination: shift effecting means responsive to application of fluid pressure thereto for moving a selected shift rod between shifted and neutral positions; shift rod selection means responsive to application of fluid pressure thereto for connecting said shift effecting means to a selected shift rod; a manually operable selector and valve means responsive thereto and connected for supplying fluid pressure to said shift effecting means for moving said shift rods into neutral; means for operating said shift rod selecting means after said shift rods reach neutral position; and means including a time delay device for supplying fluid pressure to said shift effecting means a predetermined time after said shift rod selecting means operates for moving the shift rod connected to said shift effecting means into shifted position.

11. In control apparatus operable by fluid pressure for automatically effecting shifting of the shift rods of a transmission upon selection by an operator, said transmission having a countershaft, a countershaft brake and a clutch, comprising in combination: shift effecting means responsive to application of fluid pressure thereto for moving a selected shift rod between shifted and neutral position; shift rod selection means responsive to application of fluid pressure thereto for connecting said shift effecting means to a selected shift rod; a manually operated selector for controlling operation of said shift effecting means and said shift rod selection means; manually preselectable fluid pressure operated brake operating means for applying said countershaft brake on an upshift in response to said shift rods entering neutral position; fluid pressure operated clutch operating means for disengaging said clutch when said shift rods are urged toward neutral; means including a time delay device connected to said brake operating means for releasing said brake at a predetermined time after said shift rods enter their neutral position and clutch control means for re-engaging said clutch a predetermined time after said shift rods enter their neutral position.

12. The device defined in claim 11 wherein said clutch control means are responsive to said time delay device for re-engaging said clutch in a downshift in substantially the same portion of the shifting sequence as said countershaft brake is released in an upshift, and also including further time delay means actuated only in connection with an upshift for re-engaging said clutch in an upshift a predetermined time following the entry of said shift rods into their neutral positions.

13. Control apparatus operable by fluid pressure for automatically effecting shifting of a transmission, said transmission being driven by an engine and having positively interengageable toothed elements and shift rods alternatively movable for effecting such interengagement upon selection by the operator of the next gear ratio to be engaged, comprising in combination: a shift finger alternatively engageable with said shift rods; a power rod, said shift finger being mounted on said power rod for movement therewith to move the shift rod engaged by said shift finger to or from a shifted position; a power cylinder having piston means slidable therewithin and connected to said power rod for causing corresponding movement thereof, three conduits connected to said power cylinder for supplying fluid pressure thereto, application of fluid pressure through a first of said conduits moving said shift finger and the shift rod connected thereto to its neutral position, application of fluid pressure through a second of said conduits moving said shift rod and the shift finger connected thereto into one terminal shifted position thereof, application of fluid pressure through the third of said conduits moving said shift rod first into neutral position and then, if not opposed by fluid pressure in said first conduit, into the other terminal shifted position thereof; a selector cylinder; piston means within said selector cylinder and connected for moving said shift finger from engagement with one shift rod into engagement with another shift rod when said shift rods are in neutral; a first set of valves connected for supplying fluid pressure to said selector cylinder so that said shift member may be selectively placed in engagement with one of said shift rods at a time; a neutral valve and means for actuating said neutral valve when said shift rods are in neutral; conduit means including first time delay means for supplying fluid pressure from said neutral valve to said first set of valves a predetermined time after said shift rods are in neutral whereby said selector cylinder is pressurized after said shift rods are in neutral; a manual selector for selecting the gear position of the transmission; a second set of valves connected to said first, second and third conduits for controlling the supply of fluid pressure thereto, said second set of valves including valves for first supplying fluid pressure to said first and third conduits to move said power rod to its neutral position; second conduit means, including a second time delay means, connected to said first set of valves for being pressurized thereby a predetermined time after said selector cylinder is pressurized, said second conduit means also being connected to said second set of valves for supplying fluid pressure thereto so that pressure is applied to said second and third conduits to cause the shift rod engaged by the shift finger to be moved to a shifted position a predetermined time after said power rod reaches neutral position.

14. A control apparatus as set forth in claim 13 including a fluid pressure operated clutch connected between the engine and the transmission, clutch valve means connected to said clutch for supplying fluid pressure thereto for disengaging said clutch when said power rod is urged toward neutral; and means, including said second time delay means, for shifting said clutch valve means a predetermined time after said transmission reaches neutral during a shifting operation to thereby re-engage the clutch.

15. A control apparatus as set forth in claim 14 including a fluid pressure operated brake connected to the countershaft of said transmission; a manually operable valve for supplying fluid pressure to said brake on an upshift of said transmission; means for terminating flow of pressure fluid to said countershaft brake and to said clutch and third time delay means between said brake and said clutch for holding said clutch disengaged for a predetermined time after said countershaft brake is released.

16. A control apparatus as set forth in claim 13 wherein said first set of valves includes a shift rod valve for each shift rod of said transmission; means responsive to placing of the selector in a position corresponding to a given gear setting of the transmission for actuating one of said valves to place same in position for supplying fluid pressure to the selector cylinder to move the shift finger into engagement with the appropriate shift rod; said first set of valves also including a fluid pressure operated main valve for supplying fluid pressure to said shift rod valves; and a conduit having said first time delay means therein for supplying fluid pressure to shift said main valve a predetermined time after said neutral valve is actuated by said power rod.

17. A control apparatus as set forth in claim 13 including: a conduit continuously supplying fluid pressure to said third conduit; said second set of valves including valves connected for supplying fluid pressure to said first and second conduits; said manual selector being positionable in one of three positions, and means responsive to said manual selector being in one of its positions for positioning said second set of valves for supplying pressure to only said first conduit, means responsive to said manual selector being in the second of its positions for positioning said second set of valves for supplying fluid pressure to both said first and second conduits; and means responsive to said manual selector being in the third of its positions for connecting said second set of valves to exhaust; said first-mentioned position of said manual selector being between the other two positions thereof whereby said power rod is always moved to its neutral position during each shift operation.

18. A control apparatus as set forth in claim 17 wherein said second set of valves includes a first, fluid pressure operated valve for controlling the supply of fluid pressure to said second conduit; means for supplying fluid pressure for positioning said first valve so that it does not conduct fluid pressure into said second conduit while the power rod if being moved from a shifted position into neutral and for positioning said first valve so that it is capable of conducting fluid pressure into said second conduit after said power rod reaches neutral position.

19. A control apparatus as set forth in claim 18 wherein said last-named means includes a fluid pressure operated valve connected for being actuated by pressure from said third conduit and addtional time delay means connected to said last-named valve for causing same to actuate said first valve to change the position thereof a predetermined time after said selector cylinder is pressurized and the shift finger is moved into engagement with the appropriate shift rod.

20. Control apparatus operable by fluid pressure for automatically effecting shifting of a transmission having positively interengageable toothed elements and shift rods alternatively movable for effecting such interengagement upon selection by the operator of the next gear ratio to be engaged, said transmission having a countershaft and a fluid pressure operated countershaft brake and having a fluid pressure operated clutch between the engine and the transmission, comprising in combination: a manually operable selector movable through an elongated neutral passageway and into any one of a plurality of shift positions located on either side of said passageway; a pressure source; a selecting distributor connected to said selector for connecting said pressure source for selecting a shift rod to be shifted; a shifting distributor connected to said selector for connecting said pressure source for shifting the shift rod; a shift finger; a selector cylinder and piston means therewithin for moving said shift finger into engagement with a selected shift rod; a power rod, said shift finger being mounted on said power rod; a power cylinder, said power rod being received within said power cylinder for being moved by fluid pressure therewith; three conduits communicating with said power cylinder for supplying fluid pressure thereto for moving said rod between two terminal positions and an intermediate neutral position; a first set of fluid pressure operated valves connected for supplying fluid pressure to said selector cylinder, said first set of valves including a main valve and a plurality of subsidiary valves, each subsidiary valve being connected for moving the shift finger into engagement with one of the shift rods when such valve is opened, said main valve being connected to the subsidiary valves for supplying fluid pressure thereto; means operable by said selector distributor for supplying fluid pressure for shifting said subsidiary valves, one at a time, in response to the position of said selector; a second set of fluid pressure operated valves connected to said three conduits for controlling the pressurizing thereof, said second set of valves including a pair of valves connected for supplying pressure for moving said power rod to neutral position, said second set of valves also including a third valve for supplying pressure for shifting said power rod into one of its shifted positions; means for continuously supplying fluid pressure to urge said power rod toward the other of its shifted positions; said second set of valves also including further valves for supplying fluid pressure to said third valve when said selector is on one side of said neutral passageway whereby said power rod will be urged into said one shifted position; a neutral valve actuable by said power rod; means including a first time delay chamber connecting said neutral valve to said main valve of said first set of valves whereby fluid pressure is applied to said selector cylinder a predetermined time after said transmission is placed in neutral; a manually operable countershaft brake valve and a fluid pressure operated countershaft brake valve connected in series to the pressure source and for operating the countershaft brake; and conduit means connecting said neutral valve to said fluid pressure operated countershaft brake valve whereby said countershaft brake may be applied when the transmission reaches neutral on an upshift; a fluid pressure operated switching valve connected to the pressure source and to the neutral valve for controlling supply of fluid pressure thereto; conduit means connected to said second set of valves for opening said switching valve in response to pressurizing of said pair of valves of said second set; a clutch control valve connected to said switching valve and to said clutch for disengaging said clutch upon opening of said switching valve; a clutch re-engaging valve for controlling re-engagement of the clutch; a conduit including a second time delay chamber connecting said clutch re-engaging valve to said fluid pressure operated countershaft brake valve for re-engaging said clutch a predetermined time after said countershaft brake is released; an exhaust valve connected to said switching valve and said pair of valves and connected by a conduit having a third time delay chamber therein to said main valve of said first set of valves for connecting said pair of valves to exhaust and permitting said switching valve to close a predetermined time after said selector cylinder is pressurized whereupon the shift of the power rod is completed.

21. Control apparatus for automatically effecting shifting of a transmission having shift rods upon selection by an operator, comprising in combination: shift rod engaging means altenatively engageable with said shift rods; power operated shifting means connected to said shift rod engaging means for moving same between neutral and shifted positions; power operated selector means engageable with said shift rod engaging means for moving same from one shift rod to another; neutral power flow-control means operable when said shift rods are in neutral and means including a first time delay device connected to said neutral power flow control means and to said selector means for supplying power thereto to move said shift rod engaging means into engagement with a selected shift rod a predetermined time after the shift rods reach neutral; means including a second time delay device connected between said selector means and said shifting means for supplying power to said shifting means for completing the shift of the selected shift rod a predetermined time after selection thereof.

22. Control apparatus operable by fluid pressure for automatically effecting shifting of the shift rods of a transmission upon selection by an operator, comprising in combination: shift effecting means responsive to application of fluid pressure thereto for moving a selected shift rod between shifted and neutral positions; shift rod selection means responsive to application of fluid pressure thereto for connecting said shift effecting means to a selected shift rod; a manually operable selector and valve means responsive thereto and connected for supplying fluid pressure to said shift effecting means for moving said shift rods into neutral; means including a time delay device for supplying fluid pressure to said selection means a predetermined time after said shift rods reach neutral position to select a given shift rod for shifting; and means for supplying fluid pressure to said shift effecting means after selection of a given shift rod for moving the selected shift rod into shifted position.

References Cited in the file of this patent

UNITED STATES PATENTS 2,137,961 Vorech ---------------- Nov. 22, 1938